United States Patent
Laroia et al.

(10) Patent No.: US 8,542,658 B2
(45) Date of Patent: Sep. 24, 2013

(54) SUPPORT FOR WIDE AREA NETWORKS AND LOCAL AREA PEER-TO-PEER NETWORKS

(75) Inventors: Rajiv Laroia, Far Hills, NJ (US); Junyi Li, Bedminster, NJ (US); Tom Richardson, South Orange, NJ (US); Xinzhou Wu, Monmouth Junction, NJ (US); Aleksandar Jovicic, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 11/621,972

(22) Filed: Jan. 10, 2007

(65) Prior Publication Data

US 2007/0211677 A1    Sep. 13, 2007

Related U.S. Application Data

(60) Provisional application No. 60/758,010, filed on Jan. 11, 2006, provisional application No. 60/758,011, filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(51) Int. Cl.
*H04W 4/00* (2009.01)

(52) U.S. Cl.
USPC ........... 370/338; 370/328; 370/352; 370/345; 455/522; 375/260; 375/340; 709/228

(58) Field of Classification Search
None
See application file for complete search history.

(56) References Cited

U.S. PATENT DOCUMENTS

| 2,972,743 A | 2/1961 | Svensson et al. |
| 5,216,693 A | 6/1993 | Nakamura |

(Continued)

FOREIGN PATENT DOCUMENTS

| CN | 1371583 A | 9/2002 |
| CN | 1397117 A | 2/2003 |

(Continued)

OTHER PUBLICATIONS

Yanchao Zhang, Wei Liu, Wenjing Lou, Yuguang Fang; Anonymous Handshakes in Mobile Ad Hoc Networks; MILCOM 2004—2004 IEEE Military Communications Conference; pp. 1193-1199; XP-002432989.

(Continued)

*Primary Examiner* — Dwayne Bost
*Assistant Examiner* — Gerald Johnson
(74) *Attorney, Agent, or Firm* — James K. O'Hare

(57) ABSTRACT

Systems and methodologies are described that facilitate sharing bandwidth between a wide area network and a local area peer-to-peer network. The peer-to-peer network may use an air interface technology that is similar to distinct from an air interface technology used in the wide area network. Moreover, the wide area network and the local area peer-to-peer network may utilize distinct sets of parameters. For example, if the wide area network and the peer-to-peer network use OFDM-based air interface technologies, parameters such as tone spacing, symbol time, cyclic prefix, and the like of the two networks may vary. Further, peer-to-peer parameters may be a function of parameters for the wide area network.

50 Claims, 12 Drawing Sheets

(56) References Cited

U.S. PATENT DOCUMENTS

| | | |
|---|---|---|
| 5,233,627 A | 8/1993 | Kozima et al. |
| 5,535,425 A | 7/1996 | Watanabe |
| 5,701,589 A | 12/1997 | Lee et al. |
| 5,726,893 A | 3/1998 | Schuchman et al. |
| 5,754,542 A | 5/1998 | Ault et al. |
| 5,805,575 A | 9/1998 | Kamin, Jr. |
| 5,818,871 A | 10/1998 | Blakeney, II et al. |
| 5,839,074 A | 11/1998 | Plehn |
| 5,844,900 A | 12/1998 | Hong et al. |
| 5,852,780 A | 12/1998 | Wang et al. |
| 5,903,618 A | 5/1999 | Miyake |
| 5,953,323 A | 9/1999 | Haartsen |
| 5,991,639 A | 11/1999 | Rautiola et al. |
| 5,995,500 A | 11/1999 | Ma |
| 5,995,844 A | 11/1999 | Fukuda |
| 6,011,515 A | 1/2000 | Radcliffe et al. |
| 6,011,978 A | 1/2000 | Ault et al. |
| 6,047,178 A | 4/2000 | Frlan |
| 6,175,747 B1 | 1/2001 | Tanishima et al. |
| 6,230,012 B1 | 5/2001 | Willkie et al. |
| 6,377,608 B1 | 4/2002 | Zyren |
| 6,389,062 B1 | 5/2002 | Wu |
| 6,473,418 B1 | 10/2002 | Laroia et al. |
| 6,545,997 B1 | 4/2003 | Bohnke et al. |
| 6,574,266 B1 | 6/2003 | Haartsen |
| 6,580,981 B1 | 6/2003 | Masood et al. |
| 6,609,010 B1 | 8/2003 | Dolle et al. |
| 6,611,507 B1 | 8/2003 | Hottinen et al. |
| 6,650,629 B1 | 11/2003 | Takahashi et al. |
| 6,671,525 B2 | 12/2003 | Allen et al. |
| 6,725,058 B2 | 4/2004 | Rinne et al. |
| 6,728,232 B2 | 4/2004 | Hasty, Jr. et al. |
| 6,735,448 B1 | 5/2004 | Krishnamurthy et al. |
| 6,741,836 B2 | 5/2004 | Lee et al. |
| 6,744,743 B2 | 6/2004 | Walton et al. |
| 6,760,599 B1 | 7/2004 | Uhlik |
| 6,763,013 B2 | 7/2004 | Kennedy |
| 6,771,963 B1 | 8/2004 | Cheng et al. |
| 6,859,463 B1 | 2/2005 | Mayor et al. |
| 6,882,632 B1 | 4/2005 | Koo et al. |
| 6,882,851 B2 | 4/2005 | Sugar et al. |
| 6,920,171 B2 | 7/2005 | Souissi et al. |
| 6,922,388 B1 | 7/2005 | Laroia et al. |
| 6,934,299 B2 | 8/2005 | Kaatz |
| 6,940,827 B2 | 9/2005 | Li et al. |
| 6,940,843 B2 | 9/2005 | Goodall et al. |
| 6,975,600 B1 | 12/2005 | Vaughan et al. |
| 6,975,855 B1 | 12/2005 | Wallenius |
| 6,982,987 B2 | 1/2006 | Cain |
| 6,985,087 B2 | 1/2006 | Soliman |
| 7,006,451 B2 | 2/2006 | Kuwahara |
| 7,013,145 B1 | 3/2006 | Centore, III |
| 7,016,649 B1 | 3/2006 | Narasimhan et al. |
| 7,019,616 B2 | 3/2006 | Fernandez |
| 7,027,409 B2 | 4/2006 | Cain |
| 7,035,221 B2 | 4/2006 | Furukawa et al. |
| 7,039,372 B1 | 5/2006 | Sorrells et al. |
| 7,072,650 B2 | 7/2006 | Stanforth |
| 7,092,391 B2 | 8/2006 | Umeda |
| 7,130,368 B1 | 10/2006 | Aweya et al. |
| 7,133,697 B2 | 11/2006 | Judd et al. |
| 7,136,655 B2 | 11/2006 | Skafidas et al. |
| 7,146,130 B2 | 12/2006 | Hsu et al. |
| 7,149,201 B2 | 12/2006 | Hunzinger |
| 7,164,885 B2 | 1/2007 | Jonsson et al. |
| 7,167,463 B2 | 1/2007 | Alapuranen |
| 7,174,187 B1 | 2/2007 | Ngan |
| 7,180,884 B2 | 2/2007 | Elliott et al. |
| 7,224,954 B2 | 5/2007 | Okajima et al. |
| 7,228,138 B2 | 6/2007 | Hansson et al. |
| 7,233,602 B2 | 6/2007 | Chen et al. |
| 7,246,235 B2 | 7/2007 | Ellison et al. |
| 7,260,399 B1 | 8/2007 | Oh et al. |
| 7,269,169 B1 | 9/2007 | Venkataraman et al. |
| 7,280,467 B2 | 10/2007 | Smee et al. |
| 7,280,810 B2 | 10/2007 | Feher |
| 7,313,628 B2 | 12/2007 | Chaskar et al. |
| 7,333,829 B2 | 2/2008 | Malone et al. |
| 7,336,626 B1 | 2/2008 | Barratt et al. |
| 7,336,927 B2 | 2/2008 | Diaz Cervera et al. |
| 7,339,883 B2 | 3/2008 | Santhoff et al. |
| 7,342,834 B2 | 3/2008 | Ishibashi |
| 7,342,896 B2 | 3/2008 | Ayyagari |
| 7,342,900 B2 | 3/2008 | Xiong et al. |
| 7,352,733 B2 | 4/2008 | Green |
| 7,366,200 B2 | 4/2008 | Laroia et al. |
| 7,378,953 B2 | 5/2008 | Coronel et al. |
| 7,388,845 B2 | 6/2008 | Laroia et al. |
| 7,388,857 B2 | 6/2008 | Sharma |
| 7,401,224 B2 | 7/2008 | Gantman et al. |
| 7,426,396 B2 | 9/2008 | Iwasaki et al. |
| 7,440,754 B2 | 10/2008 | Bahl et al. |
| 7,457,646 B2 | 11/2008 | Mahany et al. |
| 7,477,897 B2 | 1/2009 | Bye |
| 7,493,149 B1 | 2/2009 | Doyle et al. |
| 7,499,418 B2 | 3/2009 | Oprescu-Surcobe et al. |
| 7,502,341 B2 | 3/2009 | Matoba et al. |
| 7,512,096 B2 | 3/2009 | Kuzminskiy et al. |
| 7,545,771 B2 | 6/2009 | Wentink et al. |
| 7,548,758 B2 | 6/2009 | Periyalwar et al. |
| 7,570,627 B2 | 8/2009 | Welborn et al. |
| 7,570,969 B2 | 8/2009 | Hwang et al. |
| 7,590,183 B2 | 9/2009 | Yonge, III et al. |
| 7,613,426 B2 | 11/2009 | Kuehnel et al. |
| 7,626,975 B2 | 12/2009 | Colban et al. |
| 7,653,011 B2 | 1/2010 | Rahman et al. |
| 7,657,276 B2 | 2/2010 | Sakoda |
| 7,660,595 B2 | 2/2010 | Ramaswamy et al. |
| 7,664,055 B2 | 2/2010 | Nelson |
| 7,664,130 B2 | 2/2010 | Sakoda et al. |
| 7,720,029 B2 | 5/2010 | Orava et al. |
| 7,720,172 B2 | 5/2010 | Nakagawa et al. |
| 7,724,713 B2 | 5/2010 | Del Prado Pavon |
| 7,729,240 B1 | 6/2010 | Crane et al. |
| 7,756,521 B2 | 7/2010 | Gerlach et al. |
| 7,925,010 B2 | 4/2011 | Sannino et al. |
| 8,498,237 | 7/2013 | Corson et al. |
| 8,504,099 | 8/2013 | Corson et al. |
| 2002/0105970 A1 | 8/2002 | Shvodian |
| 2002/0128049 A1 | 9/2002 | Davis |
| 2002/0131121 A1 | 9/2002 | Jeganathan et al. |
| 2002/0131386 A1 | 9/2002 | Gwon |
| 2002/0193945 A1 | 12/2002 | Tan et al. |
| 2002/0196771 A1 | 12/2002 | Vij et al. |
| 2002/0196844 A1 | 12/2002 | Rafie et al. |
| 2003/0002482 A1* | 1/2003 | Kubler et al. ............. 370/352 |
| 2003/0007473 A1 | 1/2003 | Strong et al. |
| 2003/0012188 A1 | 1/2003 | Zelig et al. |
| 2003/0053437 A1* | 3/2003 | Bahl et al. ............... 370/345 |
| 2003/0054818 A1 | 3/2003 | Bahl |
| 2003/0069035 A1 | 4/2003 | Shurvinton |
| 2003/0078031 A1 | 4/2003 | Masuda |
| 2003/0078037 A1 | 4/2003 | Auckland et al. |
| 2003/0108016 A1 | 6/2003 | Bonta |
| 2003/0112901 A1* | 6/2003 | Gupta ..................... 375/340 |
| 2003/0128659 A1 | 7/2003 | Hirsch |
| 2003/0142631 A1 | 7/2003 | Silvester |
| 2003/0145064 A1 | 7/2003 | Hsu et al. |
| 2003/0169697 A1 | 9/2003 | Suzuki et al. |
| 2003/0210680 A1* | 11/2003 | Rao et al. ............... 370/352 |
| 2003/0217266 A1 | 11/2003 | Epp et al. |
| 2004/0005904 A1 | 1/2004 | Wolf et al. |
| 2004/0008661 A1 | 1/2004 | Myles |
| 2004/0009781 A1 | 1/2004 | Andrews et al. |
| 2004/0028003 A1 | 2/2004 | Diener |
| 2004/0032536 A1 | 2/2004 | Islam et al. |
| 2004/0047324 A1 | 3/2004 | Diener |
| 2004/0057400 A1 | 3/2004 | Walsh et al. |
| 2004/0063458 A1 | 4/2004 | Hori |
| 2004/0064568 A1 | 4/2004 | Arora |
| 2004/0067773 A1 | 4/2004 | Rachabathuni et al. |
| 2004/0072558 A1 | 4/2004 | Van Bosch |
| 2004/0077346 A1 | 4/2004 | Krenik et al. |
| 2004/0077366 A1 | 4/2004 | Panasik et al. |

| | | |
|---|---|---|
| 2004/0081117 A1 | 4/2004 | Malek et al. |
| 2004/0082326 A1 | 4/2004 | Shaw et al. |
| 2004/0082356 A1* | 4/2004 | Walton et al. ............. 455/522 |
| 2004/0090924 A1 | 5/2004 | Giaimo |
| 2004/0095902 A1 | 5/2004 | Laroia et al. |
| 2004/0095904 A1 | 5/2004 | Laroia et al. |
| 2004/0114521 A1 | 6/2004 | Sugaya |
| 2004/0125776 A1 | 7/2004 | Haugli et al. |
| 2004/0125778 A1 | 7/2004 | Lin et al. |
| 2004/0127204 A1 | 7/2004 | Belmont |
| 2004/0127214 A1 | 7/2004 | Reddy |
| 2004/0127240 A1 | 7/2004 | Li |
| 2004/0133689 A1* | 7/2004 | Vasisht ............. 709/228 |
| 2004/0145604 A1 | 7/2004 | Min |
| 2004/0147223 A1 | 7/2004 | Cho |
| 2004/0152464 A1 | 8/2004 | Sugaya |
| 2004/0162871 A1 | 8/2004 | Pabla et al. |
| 2004/0165563 A1 | 8/2004 | Hsu et al. |
| 2004/0176059 A1 | 9/2004 | Hayem et al. |
| 2004/0190483 A1 | 9/2004 | Shahaf et al. |
| 2004/0203762 A1 | 10/2004 | Liu et al. |
| 2004/0204850 A1 | 10/2004 | MacNeille |
| 2004/0240401 A1 | 12/2004 | Willenegger et al. |
| 2004/0240405 A1 | 12/2004 | Okazaki |
| 2004/0240476 A1 | 12/2004 | Joshi |
| 2004/0258006 A1 | 12/2004 | An |
| 2004/0259529 A1 | 12/2004 | Suzuki |
| 2005/0009578 A1 | 1/2005 | Liu |
| 2005/0025092 A1 | 2/2005 | Morioka |
| 2005/0058102 A1 | 3/2005 | Santhoff et al. |
| 2005/0058117 A1 | 3/2005 | Morioka et al. |
| 2005/0058229 A1 | 3/2005 | Alagha |
| 2005/0060535 A1 | 3/2005 | Bartas |
| 2005/0063344 A1 | 3/2005 | Winzell |
| 2005/0063416 A1 | 3/2005 | Shin et al. |
| 2005/0068934 A1 | 3/2005 | Sakoda |
| 2005/0075118 A1 | 4/2005 | Lewis et al. |
| 2005/0085190 A1 | 4/2005 | Nishikawa |
| 2005/0085214 A1 | 4/2005 | Laroia |
| 2005/0088980 A1 | 4/2005 | Olkkonen et al. |
| 2005/0090266 A1 | 4/2005 | Sheynblat |
| 2005/0105491 A1 | 5/2005 | Chaskar et al. |
| 2005/0111397 A1 | 5/2005 | Attar et al. |
| 2005/0117525 A1 | 6/2005 | Poustchi |
| 2005/0117530 A1 | 6/2005 | Abraham |
| 2005/0128991 A1 | 6/2005 | Dayanandan et al. |
| 2005/0129221 A1 | 6/2005 | Dickens et al. |
| 2005/0135295 A1 | 6/2005 | Walton |
| 2005/0143119 A1 | 6/2005 | Chandra et al. |
| 2005/0152280 A1 | 7/2005 | Pollin et al. |
| 2005/0153736 A1 | 7/2005 | Ganton |
| 2005/0157660 A1 | 7/2005 | Mandato et al. |
| 2005/0176371 A1 | 8/2005 | Palin et al. |
| 2005/0177639 A1 | 8/2005 | Reunamaki |
| 2005/0180353 A1* | 8/2005 | Hansen et al. ............. 370/328 |
| 2005/0185669 A1 | 8/2005 | Welborn et al. |
| 2005/0201308 A1 | 9/2005 | Sekiya et al. |
| 2005/0210157 A1 | 9/2005 | Sakoda |
| 2005/0220201 A1* | 10/2005 | Laroia et al. ............. 375/260 |
| 2005/0226175 A1 | 10/2005 | Gupta |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0250469 A1 | 11/2005 | Laroia et al. |
| 2005/0254435 A1 | 11/2005 | Moakley et al. |
| 2005/0265218 A1 | 12/2005 | Molisch et al. |
| 2005/0265221 A1 | 12/2005 | Batra et al. |
| 2005/0276243 A1 | 12/2005 | Sugaya et al. |
| 2005/0281320 A1 | 12/2005 | Neugebauer |
| 2005/0286477 A1 | 12/2005 | Gupta et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1 | 1/2006 | Hamnen |
| 2006/0025151 A1 | 2/2006 | Karaoguz et al. |
| 2006/0031583 A1 | 2/2006 | Fujii et al. |
| 2006/0034315 A1 | 2/2006 | Maekawa et al. |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |
| 2006/0111104 A1 | 5/2006 | Hyslop |
| 2006/0114853 A1 | 6/2006 | Hasty, Jr. et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0075033 A1* | 3/2008 | Shattil ............. 370/328 |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |
| 2009/0296669 A1 | 12/2009 | Uchiyama et al. |
| 2010/0128652 A1 | 5/2010 | Lee et al. |

FOREIGN PATENT DOCUMENTS

| | | |
|---|---|---|
| CN | 1411237 | 4/2003 |
| CN | 1578314 A | 2/2005 |
| CN | 1596005 A | 3/2005 |
| CN | 1663156 | 8/2005 |
| CN | 1689345 A | 10/2005 |

| | | | | | | |
|---|---|---|---|---|---|---|
| EP | 0776134 | | 5/1997 | JP | 2005354326 A | 12/2005 |
| EP | 0848567 | A1 | 6/1998 | JP | 2005537762 T | 12/2005 |
| EP | 0969602 | A1 | 1/2000 | JP | 2006005792 A | 1/2006 |
| EP | 1089586 | A1 | 4/2001 | JP | 2006501777 A | 1/2006 |
| EP | 1119137 | A1 | 7/2001 | JP | 2007509531 | 4/2007 |
| EP | 1241838 | A2 | 9/2002 | JP | 2007525891 A | 9/2007 |
| EP | 1326386 | A1 | 7/2003 | JP | 2007533256 | 11/2007 |
| EP | 1408651 | A1 | 4/2004 | JP | 2008507219 T | 3/2008 |
| EP | 1469659 | A1 | 10/2004 | JP | 2008228128 A | 9/2008 |
| EP | 1496668 | | 1/2005 | JP | 2009523379 | 6/2009 |
| EP | 1549094 | A1 | 6/2005 | JP | 4927869 | 2/2012 |
| EP | 1562333 | | 8/2005 | KR | 960012088 B1 | 9/1996 |
| EP | 1566944 | | 8/2005 | KR | 100225765 B1 | 10/1999 |
| EP | 1592176 | | 11/2005 | KR | 20000035806 A | 6/2000 |
| EP | 1670183 | A1 | 6/2006 | KR | 10362135 | 11/2002 |
| EP | 1895714 | | 3/2008 | KR | 20030024435 A | 3/2003 |
| EP | 2312885 | | 4/2011 | TW | 540210 | 7/2003 |
| GB | 232251 | A1 | 3/1926 | TW | 545006 B | 8/2003 |
| GB | 2375014 | A1 | 10/2002 | TW | I230525 | 4/2005 |
| GB | 2410653 | A | 8/2005 | TW | I239782 | 9/2005 |
| JP | 7023465 | | 1/1995 | TW | 286515 | 1/2006 |
| JP | 07143567 | | 6/1995 | TW | I250742 | 3/2006 |
| JP | 8307934 | | 11/1996 | TW | M292848 | 6/2006 |
| JP | 9107583 | | 4/1997 | WO | WO9701256 | 1/1997 |
| JP | 10013324 | | 1/1998 | WO | WO9749258 A1 | 12/1997 |
| JP | 11289583 | A | 10/1999 | WO | WO9808321 | 2/1998 |
| JP | 11355291 | | 12/1999 | WO | WO0074429 | 12/2000 |
| JP | 2001069060 | A | 3/2001 | WO | WO0101717 A1 | 1/2001 |
| JP | 2001069557 | A | 3/2001 | WO | 0192992 A2 | 12/2001 |
| JP | 2002502164 | | 1/2002 | WO | 0223758 | 3/2002 |
| JP | 2002112347 | A | 4/2002 | WO | WO0249387 A1 | 6/2002 |
| JP | 2002208891 | A | 7/2002 | WO | 02078271 A1 | 10/2002 |
| JP | 2002223470 | | 8/2002 | WO | 02082742 A1 | 10/2002 |
| JP | 2002232337 | A | 8/2002 | WO | WO03001742 | 1/2003 |
| JP | 2002325281 | A | 11/2002 | WO | 03017596 A2 | 2/2003 |
| JP | 2002344458 | A | 11/2002 | WO | 03039054 | 5/2003 |
| JP | 2003503920 | | 1/2003 | WO | WO03090037 A2 | 10/2003 |
| JP | 2003143644 | A | 5/2003 | WO | 2004012464 A2 | 2/2004 |
| JP | 2003158525 | A | 5/2003 | WO | 2004019529 A2 | 3/2004 |
| JP | 2003249939 | A | 9/2003 | WO | WO2004023241 A2 | 3/2004 |
| JP | 2003348636 | A | 12/2003 | WO | 2004032536 A2 | 4/2004 |
| JP | 2004032462 | A | 1/2004 | WO | WO2004047348 A1 | 6/2004 |
| JP | 2004053510 | A | 2/2004 | WO | WO2004066646 A1 | 8/2004 |
| JP | 2004128785 | A | 4/2004 | WO | WO2004071022 A1 | 8/2004 |
| JP | 2004146883 | A | 5/2004 | WO | 2004080103 A1 | 9/2004 |
| JP | 2004147015 | A | 5/2004 | WO | WO2004077920 A2 | 9/2004 |
| JP | 2004242187 | A | 8/2004 | WO | WO2005013529 A2 | 2/2005 |
| JP | 2004247820 | A | 9/2004 | WO | 2005022846 A1 | 3/2005 |
| JP | 2004254254 | A | 9/2004 | WO | WO2005020517 | 3/2005 |
| JP | 2004260258 | A | 9/2004 | WO | WO2005027556 A1 | 3/2005 |
| JP | 2004260748 | A | 9/2004 | WO | 2005038606 A2 | 4/2005 |
| JP | 2004336351 | A | 11/2004 | WO | 2005039105 A1 | 4/2005 |
| JP | 2004533762 | | 11/2004 | WO | WO2005034433 A1 | 4/2005 |
| JP | 2004349777 | A | 12/2004 | WO | WO2005039128 | 4/2005 |
| JP | 2004350168 | A | 12/2004 | WO | 2005053346 A1 | 6/2005 |
| JP | 2004363877 | A | 12/2004 | WO | 2005053347 A1 | 6/2005 |
| JP | 2005033808 | A | 2/2005 | WO | WO2005053253 | 6/2005 |
| JP | 2005045368 | | 2/2005 | WO | WO2005055527 | 6/2005 |
| JP | 2005065101 | A | 3/2005 | WO | WO2005060209 A1 | 6/2005 |
| JP | 2005072910 | A | 3/2005 | WO | WO2005062552 A1 | 7/2005 |
| JP | 2005086234 | A | 3/2005 | WO | 2005071998 A1 | 8/2005 |
| JP | 2005086408 | | 3/2005 | WO | 2005076543 A1 | 8/2005 |
| JP | 2005136529 | A | 5/2005 | WO | WO2005079012 A1 | 8/2005 |
| JP | 2005151525 | A | 6/2005 | WO | 2005109657 A1 | 11/2005 |
| JP | 2005167502 | A | 6/2005 | WO | WO2005109916 | 11/2005 |
| JP | 2005210703 | A | 8/2005 | WO | WO2005109917 A1 | 11/2005 |
| JP | 2005223722 | A | 8/2005 | WO | 2005117463 A1 | 12/2005 |
| JP | 2005223767 | A | 8/2005 | WO | WO2005119478 | 12/2005 |
| JP | 2005523616 | A | 8/2005 | WO | 2006000617 A1 | 1/2006 |
| JP | 2005236819 | A | 9/2005 | WO | 2006007946 A1 | 1/2006 |
| JP | 2005244698 | A | 9/2005 | WO | WO2006057815 | 6/2006 |
| JP | 2005252645 | A | 9/2005 | WO | WO2006138122 A2 | 12/2006 |
| JP | 2005253047 | A | 9/2005 | WO | 2007038896 A2 | 4/2007 |
| JP | 2005277599 | A | 10/2005 | WO | WO2007082247 | 7/2007 |
| JP | 2005277815 | A | 10/2005 | WO | WO2008014336 A2 | 1/2008 |
| JP | 2005295400 | | 10/2005 | WO | 2008020162 A2 | 2/2008 |
| JP | 2005328231 | | 11/2005 | WO | WO2008072346 A1 | 6/2008 |
| JP | 2005533616 | T | 11/2005 | | | |
| JP | 2005348203 | | 12/2005 | | | |

OTHER PUBLICATIONS

Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.

Niels Hoven, Anant Sahai; Power Scaling for Cognitive Radio; 2005 International Conference on Wireless Networks, Communications and Mobile Computing; pp. 250-255.

Jose Costa-Requena, Raimo Kantola, Nicklas Beijar; Incentive.

Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337 : XP-10855130A.

Cabric D et al: "Implementation Issues in Spectrum Sensing for Cognitive Radios" Signals, Systems and Computers, 2004. Conference Record of the Thirty-Eighth Asilomar Conference on Pacific Grove, CA Nov. 7-10, 2004 pp. 772-776 XP-010781056.

Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.

Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.

Dagres et al., "Flexible Radio: A General Framework With Phy-Layer Algorithm-Design Insights" EUROCON 2005, Nov. 22-24, 2005 pp. 120-123, XP-10916036.

Van De Beek, "ML Estimation of Time and Frequency Offset in OFDM Systems" IEEE Transactions on Signal Processing, vol. 45 No. 7 Jul. 1997, XP-11057861.

Brandes S et al: "Reduction of Out-Of-Band Radiation in OFDM Based Overlay Systems" New Frontiers in Dynamic Spectrum Access Networks, 2005. Dyspan 2005. 2005 First IEEE International Symposium on Baltimore, MD, USA Nov. 8-11, 2005, Piscataway, NJ, USA,IEEE, (Nov. 8, 2005), pp. 662-665, XP010855171 ISBN: 1-4244-0013-9.

International Search Report—PCT/US2007/060356, International Search Authority—European Patent Office—May 24, 2007.

Written Opinion—PCT/US2007/060356, International Search Authority—European Patent Office—May 24, 2007.

International Preliminary Report on Patentability—PCT/US2007/060356, International Search Authority—The International Bureau of WIPO—Geneva, Switzerland—Jul. 15, 2008.

European Search Report—EP10176878—Search Authority—Munich—Apr. 11, 2011.

European Search Report—EP10178266—Search Authority—Munich—Apr. 5, 2011.

European Search Report—EP10187769 ,Search Authority—Munich Patent Office, Dec. 2, 2010.

European Search Report—EP10189181, Search Authority—Munich Patent Office, Mar. 9, 2011.

European Search Report—EP10189182—Search Authority—Munich—Mar. 10, 2011.

European Search Report—EP10191747—Search Authority—Munich—Mar. 18, 2011.

European Search Report—EP11150402—Search Authority—Munich—Mar. 14, 2011.

European Search Report—EP11150397—Search Authority—Munich—Mar. 15, 2011.

International Search Report and Written Opinion—PCT/US2009/058649, ISA/EPO—May 17, 2011.

Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].

Taiwan Search Report—096101138—TIPO—Jan. 4, 2011.
Taiwan Search Report—TW096101103—TIPO—Jan. 28, 2011.
Taiwan Search Report—TW096101104—TIPO—Jan. 27, 2011.
Taiwan Search Report—TW096101119—TIPO—Mar. 10, 2011.
Taiwan Search Report—TW096101125—TIPO—Nov. 5, 2010.
Taiwan Search Report—TW096101130—TIPO—Jan. 14, 2011.
Taiwan Search Report—TW096101132—TIPO—Jan. 31, 2011.
Taiwanese Search report—096101180—TIPO—Sep. 3, 2010.

Translation of Office Action in Japan application 2008-550500 corresponding to U.S. Appl. No. 11/621,984, citing Niels_Hoven_et_al_pgs_250_255_year_2005, JP2005354326, JP2005151525, JP2001069060, JP2002232337 and JP2005537762 dated Mar. 29, 2011.

Translation of Office Action in Japan application 2008-550506 corresponding to U.S. Appl. No. 11/621,966, citing JP9107583, JP10013324, JP2003249939 and JP11355291 dated Mar. 29, 2011.

Translation of Office Action in Japan application 2008-550523 corresponding to U.S. Appl. No. 11/621,990, citing JP2004349777, JP2004336351, JP2005065101, JP2004260748, JP2004242187 and JP20042542542 dated Mar. 29, 2011.

Translation of Office Action in Korean Application 2008-7019606 corresponding to U.S. Appl. No. 11/621,967, citing GB2375014 and US20050025092 dated Feb. 23, 2011.

Waters, B. et al.: "New Client Puzzle Outsourcing Techniques for DoS Resistance" CCS'04, Oct. 29, 2004, pp. 1-11, XP002538930 Washington, DC, USA abstract paragraph [01.2].

IEEE Computer Society, Part 15.4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.

IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.

IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. Mar. 2003, pp. 8 to 16, 108 to 111, 116 to 117, 170 to 171, and 204 to 206.

Wada, Y. et al., "Consideration of OFDM Cellular System Using Single Band", IEICE Year 2002 Communication Society Convention Lecture Papers 1, Sep. 10-13, 2002, p. 355, B-5-58.

Taiwan Search Report—TW96101128—TIPO—Feb. 19, 2012.

Hlavacs H., et al., "Enhancing ZRTP by using Computational Puzzles", Journal of Universal Computer Science, vol. 14 No. 5, Feb. 28, 2008, pp. 693-716.

Kim S., et al., "Reliable transfer on wireless sensor networks", 2004. IEEE SECON 2004—IEEE, pp. 449-459.

Feng W et al., "Design and implementation of network puzzles", INFOCOM 2005 Proceedings IEEE 24th Annual Joint Conference of the IEEE Computer and Communications Societies Mar., 2005, pp. 2372-2382, vol. 4.

\* cited by examiner

US 8,542,658 B2

SUPPORT FOR WIDE AREA NETWORKS AND LOCAL AREA PEER-TO-PEER NETWORKS

CROSS-REFERENCE TO RELATED APPLICATIONS

This application claims the benefit of U.S. Provisional Patent application Ser. No. 60/758,010 entitled "METHODS AND APPARATUS FOR FACILITATING IDENTIFICATION, SYNCHRONIZATION OR ACQUISITION USING BEACON SIGNALS" which was filed Jan. 11, 2006; U.S. Provisional Patent application Ser. No. 60/758,011 entitled "METHODS AND APPARATUS FOR USING BEACON SIGNALS FOR IDENTIFICATION, SYNCHRONIZATION OR ACQUISITION IN AN AD HOC WIRELESS NETWORK" which was filed Jan. 11, 2006; U.S. Provisional Patent application Ser. No. 60/758,012 entitled "METHODS AND APPARATUS FOR USING BEACON SIGNALS IN A COGNITIVE RADIO NETWORK" which was filed Jan. 11, 2006; U.S. Provisional Patent application Ser. No. 60/845,052 entitled "POWER ALLOCATION SCHEME" which was filed Sep. 15, 2006; U.S. Provisional Patent application Ser. No. 60/845,051 entitled "BEACONS IN A MIXED WIRELESS COMMUNICATION SYSTEM" which was filed Sep. 15, 2006; and U.S. Provisional Patent application Ser. No. 60/863,304 entitled "BEACONS IN A MIXED COMMUNICATION SYSTEM" which was filed Oct. 27, 2006. The entireties of the aforementioned applications are herein incorporated by reference.

BACKGROUND

I. Field

The following description relates generally to wireless communications, and more particularly to supporting communication via a wide area network and a local area peer-to-peer network within a common wireless spectrum.

II. Background

Wireless communication systems are widely deployed to provide various types of communication; for instance, voice and/or data may be provided via such wireless communication systems. A typical wireless communication system, or instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, when portions of the wireless spectrum are employed for a wide area network (e.g., a cellular infrastructure network), a significant subset of spectrum over which the wide area network is effectuated is oftentimes unused in a given geographic location or in a given time interval.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating sharing of bandwidth between a wide area network and a local area peer-to-peer network. The local area peer-to-peer network may use an air interface technology that is similar or distinct from an air interface technology used in the wide area network. For example, the wide area network may use an OFDM-based air interface technology (e.g., 3GPP LTE, WiMax, Flash-OFDM, . . . ), a CDMA-based air interface technology (e.g., CDMA-2000, EV-DO, UMTS wideband CDMA, HSPA, . . . ) or a TDMA-based air interface technology (e.g., GSM, GPRS, EDGE, . . . ), while the local area peer-to-peer network may use an OFDM-based air interface technology. Moreover, the wide area network and the local area peer-to-peer network may utilize distinct sets of parameters. For example, suppose that the wide area network and the local area peer-to-peer network both use OFDM-based air interface technologies. Accordingly, the physical layer parameters, such as tone spacing, symbol time, cyclic prefix, and the like, of the two networks may be very different. Further, peer-to-peer parameters may be a function of parameters used in the wide area network, so that a terminal may first identify the air interface technology and/or estimate the parameters used in the wide area network, and then derive the parameters to be used in the local area peer-to-peer network.

According to related aspects, a method that facilitates communicating via a shared spectrum is described herein. The method may comprise employing a first set of parameters for a wide area network in a wireless spectrum. Further, the method may include employing a second set of parameters for a local area peer-to-peer network in the same wireless spectrum.

Another aspect relates to a wireless communications apparatus. The wireless communications apparatus may include a memory that retains instructions related to identifying a wide area network and accessing parameter data to be used for a peer-to-peer network as a function of the identified wide area network. Further, the wireless communications apparatus may include a processor, coupled to the memory, configured to execute the instructions retained in the memory.

Yet another aspect relates to a wireless communications apparatus that enables communication over a wide area network and a local area peer-to-peer network. The wireless communications apparatus may include means for identifying a wide area network; and means for accessing parameters to be used for a local area peer-to-peer network as a function of the identified wide area network.

Still another aspect relates to a machine-readable medium having stored thereon machine-executable instructions for utilizing a first set of parameters for a wide area network, and utilizing a second set of parameters for a local area peer-to-peer network that leverages a common wireless spectrum as the wide area network.

In accordance with another aspect, an apparatus in a wireless communication system may include a processor, wherein the processor may be configured to identify a wide area network; and obtain a set of parameters to utilize for a peer-to-peer network based on the identity of the wide area network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
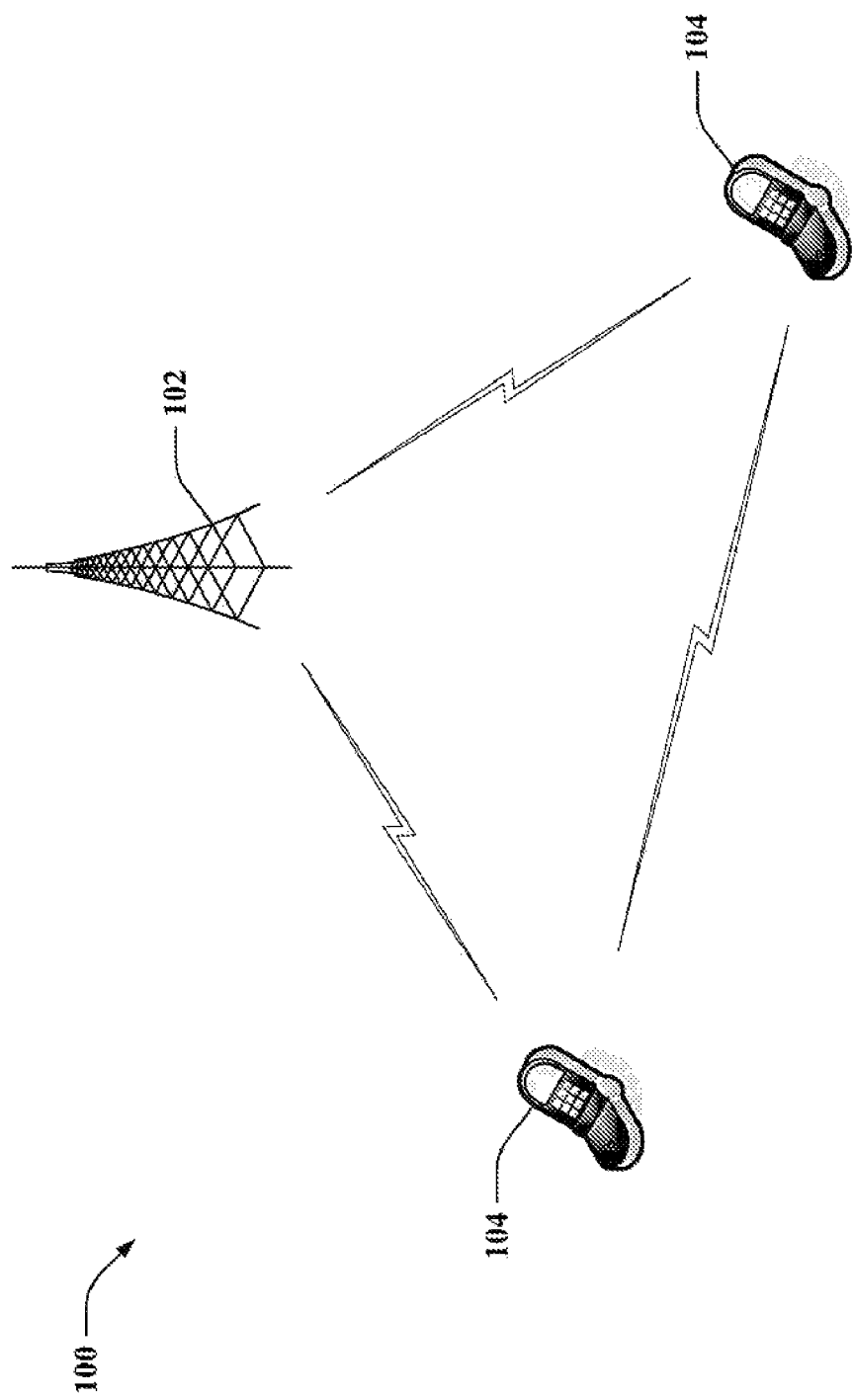
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise a base station 102 (e.g., access point) and/or any number of disparate base stations (not shown) in one or more sectors that receive, transmit, repeat, etc. wireless communication signals to each other and/or to one or more wireless terminals 104. Base station 102 can comprise a transmitter chain and a receiver chain, each of which can in turn comprise a plurality of components associated with signal transmission and reception (e.g., processor, modulators, multiplexers, demodulators, demultiplexers, antennas, . . . ) as will be appreciated by one skilled in the art. Wireless terminals 104 can be, for example, cellular phones, smart phones, laptops, handheld communication devices, handheld computing devices, satellite radios, global positioning systems, PDAs, and/or any other suitable device for communicating over wireless communication system 100.

System 100 may support various types of networks for communicating between base station(s) 102 and/or wireless terminal(s) 104. For example, a wide area network (WAN) (e.g., a cellular network) may leverage system 100. Further to this example, wireless terminals 104 may transfer data to and/or obtain data from base station 102 (and/or any disparate base stations) by utilizing the wide area infra-structure network. Pursuant to another example, a local area peer-to-peer (P2P) network may be supported by system 100; as such, wireless terminals 104 (e.g., peers) may communicate with each other via the peer-to-peer architecture, in which a wireless terminal 104 may send the signal directly to another wireless terminal 104, without going through the base station 102.

Communications effectuated with the differing types of networks may be carried out over a common wireless spectrum; thus, bandwidth may be shared for transferring data via disparate types of networks. A shared portion of the wireless spectrum, for instance, may be primarily used by a wide area network. Further, peer-to-peer communication may opportunistically take place via the shared portion of the wireless spectrum when the portion of the spectrum is not utilized by the wide area network. Thus, inefficiencies associated with spectrum utilization may be mitigated since unused bandwidth associated with the wide area network may be employed for local area peer-to-peer communication. Alternatively or additionally, interference management or mitigation techniques may be used so that the shared portion of the spectrum can be used simultaneously by the wide area network and the local area peer-to-peer communications, thereby increasing the spectrum reuse efficiency of the bandwidth.

Differing types of networks supported by system 100 may utilize disparate parameters such as tone spacing, symbol time, and cyclic prefix in connection with transferring data. Further, for example, parameters employed in connection with a first type of network (e.g., peer-to-peer network, wide area network, . . . ) may be a function of parameter utilized for a second type of network (e.g., wide area network, peer-to-peer network, . . . ). The air interface technique employed in the wide area network may be designed to operate in such an environment. For example, the air interface may be Orthogonal Frequency Division Multiplexing (OFDM) based. Accordingly, system parameters such as tone spacing, symbol time, and cyclic prefix may be chosen such that the air interface is robust for high mobility and long delay spread. Further, the operation environment for peer-to-peer communication may be different, since mobility may be low and the delay spread may be short. Moreover, a peer may operate in a half-duplex mode such that it cannot simultaneously receive and transmit signals (e.g., in the peer-to-peer architecture). Thus, choices of parameters for the peer-to-peer network may differ from parameters for the wide area network, even through the networks may operate in the same spectrum. For example, in peer-to-peer communication, tone spacing may be larger to enable shortening symbol time, thereby allowing the peer to quickly switch between receiving and transmitting modes. On the other hand, in peer-to-peer communication, tone spacing may be smaller because of the lower mobility, thereby making the symbol time long and reducing the relative overhead due to the cyclic prefix. In addition, the cyclic prefix may be shorter to reduce overhead in the peer-to-peer network. Values of system parameters in the peer-to-peer network may be derived from values of system parameters in the wide area network in a predetermined manner so that peers can synchronize themselves and the peer-to-peer communication based on signals in the wide area network. Accordingly, the parameters may be different. Furthermore, the air interface technique used in the peer-to-peer network may also be distinct from that used in the wide area network. For example, the wide area network may use a CDMA-based air interface technology (e.g., CDMA-2000, EV-DO, UMTS wideband CDMA, HSPA, . . . ) or a TDMA-based air interface technology (e.g., GSM, GPRS, EDGE, . . . ), while the local area peer-to-peer network may use an OFDM-based air interface technology.

Figure 2:
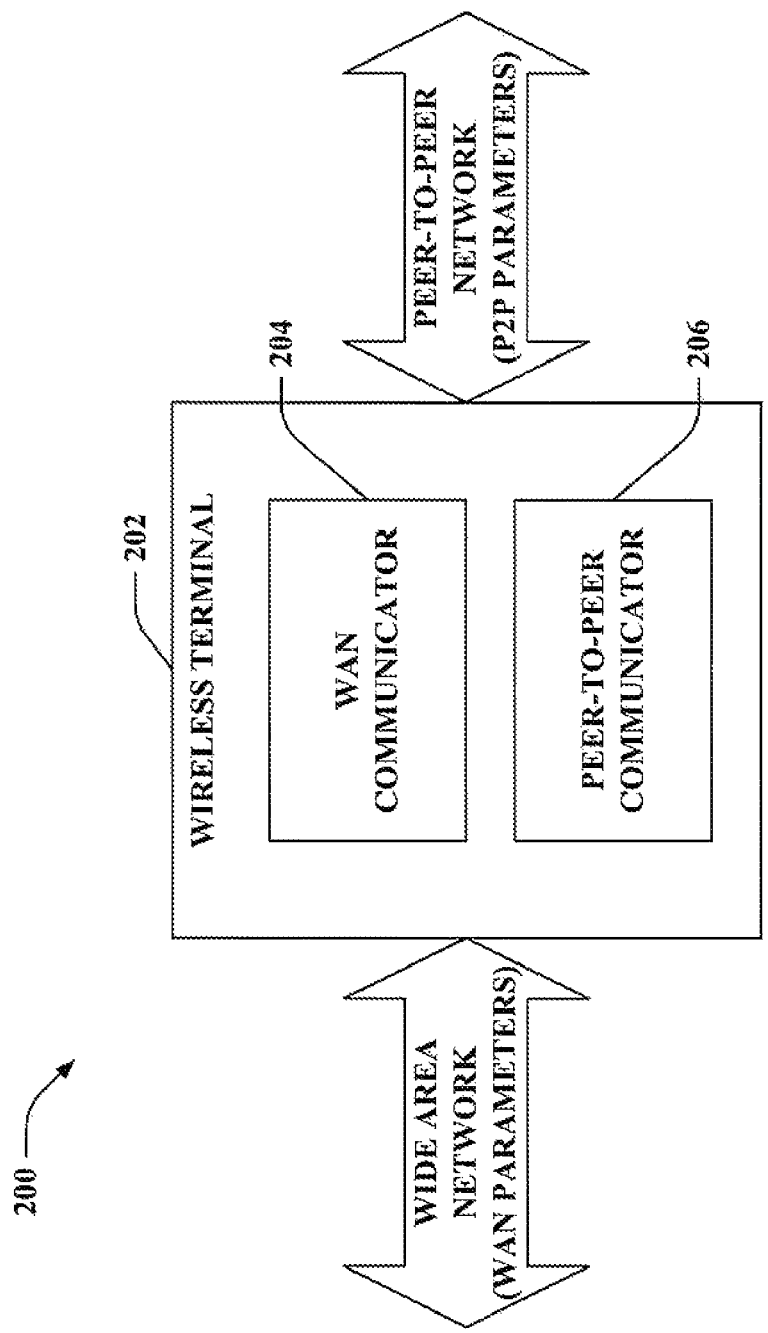
FIG. 2 is an illustration of an example system that enables communicating via disparate networks within a common wireless spectrum.

Now turning to FIG. 2, illustrated is a system 200 that enables communicating via disparate networks within a common wireless spectrum. System 200 may include a wireless terminal 202 that further includes a WAN communicator 204 and a peer-to-peer communicator 206. WAN communicator 204 enables wireless terminal 202 to transmit and/or receive data over a wide area network utilizing a first set of parameters (e.g., WAN parameters). According to an example, WAN communicator 204 may facilitate communicating via any type of wide area network (e.g., Long Term Evolution (LTE), Third Generation Partnership Project (3GPP), Third Generation Partnership Project 2 (3GPP2), Universal Mobile Telecommunications System (UMTS), WiMax, Flash-OFDM, . . . ). By way of illustration, WAN communicator 204 may enable communication between wireless terminal 202 and a base station (not shown).

Further, peer-to-peer communicator 206 enables sending and/or obtaining information over a peer-to-peer network (e.g., transmitting data to and/or receiving data from peer(s)) with a second set of parameters (e.g., P2P parameters). Moreover, the spectrum (e.g., bandwidth) utilized by WAN communicator 204 to communicate over the wide area network may be shared with peer-to-peer communicator 206 for communication over the peer-to-peer network; thus, as opposed to conventional techniques that may utilize a plurality of networks that each employ distinct portions of the wireless spectrum, the claimed subject matter leverages a common bandwidth (e.g., same spectrum) for effectuating communications with disparate network architectures. By way of illustration, peer-to-peer communicator 206 may enable direct communication between wireless terminal 202 and another wireless terminal (not shown).

WAN parameters utilized by WAN communicator 204 may differ from P2P parameters employed by peer-to-peer communicator 206. For example, suppose that both the WAN and the P2P networks use OFDM-based air interface technologies, in which case the WAN parameters and P2P parameters may pertain to tone spacing, symbol time, cyclic prefix, and so forth. Further, the parameters utilized in connection with each type of network may be chosen to optimize communication via such network. By way of illustration, tone spacing may be determined based upon mobility since mobility may cause a Doppler effect that leads to a frequency shift. Accordingly, a frequency of a particular tone generated by a transmitter may be shifted to a different frequency when the tone is obtained at a receiver (e.g., based upon the Doppler effect). Thus, tone spacing may be selected to be much larger than the expected Doppler. Pursuant to another example, the cyclic prefix for a particular type of network may be determined to be greater than an expected delay spread, which may be a function of an area covered by a network (e.g., geographic area associated with the network over which signals propagate). Delay spread relates to multiple copies of a signal arriving at a receiver at slightly different times due to propagation via disparate paths between a transmitter and a receiver (e.g., multipath). As such, delay spread is a function of area over which propagation occurs.

Figure 3:
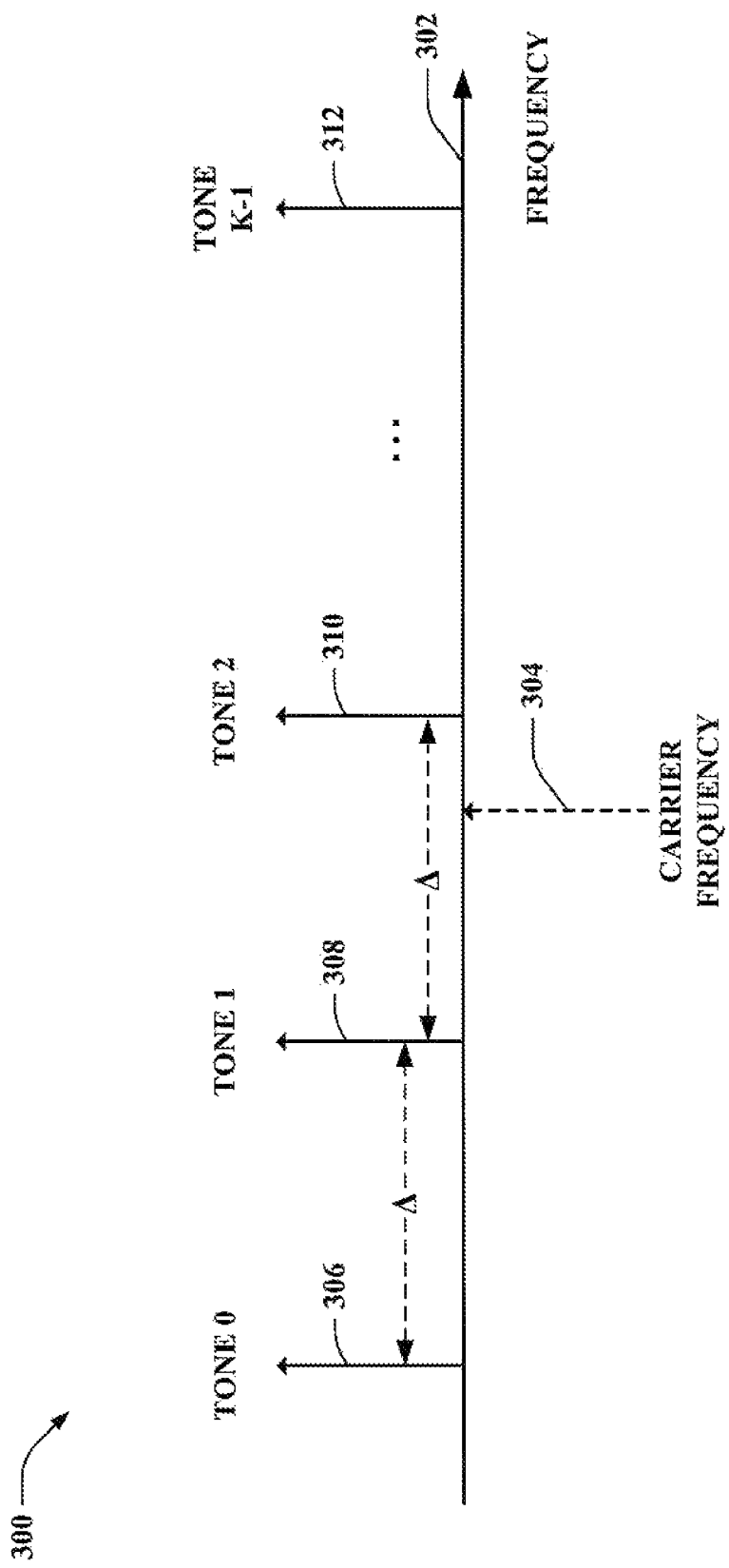
FIG. 3 is an illustration of an example frequency spectrum in accordance with various aspects.

With reference to FIG. 3, illustrated is an example frequency spectrum 300 in accordance with various aspects. As depicted, horizontal axis 302 represents frequency. A total amount of available bandwidth for a particular carrier frequency 304 may divided into K equally spaced tones (e.g., with tone spacing of Δ), where K may be any integer. These tones may be indexed from 0 to K-1. For example tone 0 306, tone 1 308, tone 2 310 and tone K-1 312 are illustrated; however, the claimed subject matter is not so limited.

Tone spacing, Δ, may be a unique parameter that corresponds to the type of network over which communication occurs; thus, distinct tone spacings may be utilized for a wide area network as compared to a local area peer-to-peer network. Further, each particular type of wide area network may be associated with a corresponding tone spacing (e.g., Flash-OFDM may utilize a tone spacing of 11.25 kHz, 3GPP2 may employ a tone spacing of 9.6 kHz, . . . ). Moreover, the tone spacing of a local area peer-to-peer network may be a function of the tone spacing associated with the particular type of wide area network with which a common bandwidth is shared (e.g., the local area peer-to-peer network may be effectuated within at least a portion of the geographic area covered by the wide area network). Thus, in accordance with an example, if the local area peer-to-peer network coexists in a given spectrum with 3GPP2, the parameters of the peer-to-peer network (e.g., including the tone spacing) may be a function of the parameters (e.g., tone spacing) for 3GPP2.

Tone spacing may depend on mobility. For example, mobility may cause a Doppler effect, which yields a frequency shift. Accordingly, tone 0 306 may be transmitted with a corresponding frequency; however, when obtained at a receiver, tone 0 306 may have shifted to a different frequency. A tone spacing may be selected that is much larger than an expected Doppler shift. Pursuant to an example, the tone spacing may be about a factor of 100 greater than the expected Doppler. Hence, if the expected Doppler shift is 100 Hz (e.g., for a WAN), the tone spacing may be on an order of 10 kHz. However, it is to be appreciated that the claimed subject matter is not so limited to the aforementioned example. Moreover, for a local area peer-to-peer environment, mobility may be lower as compared to wide area networks, and thus, the Doppler may be smaller. Accordingly, smaller tone spacing may be employed for local area peer-to-peer networks.

Figure 4:
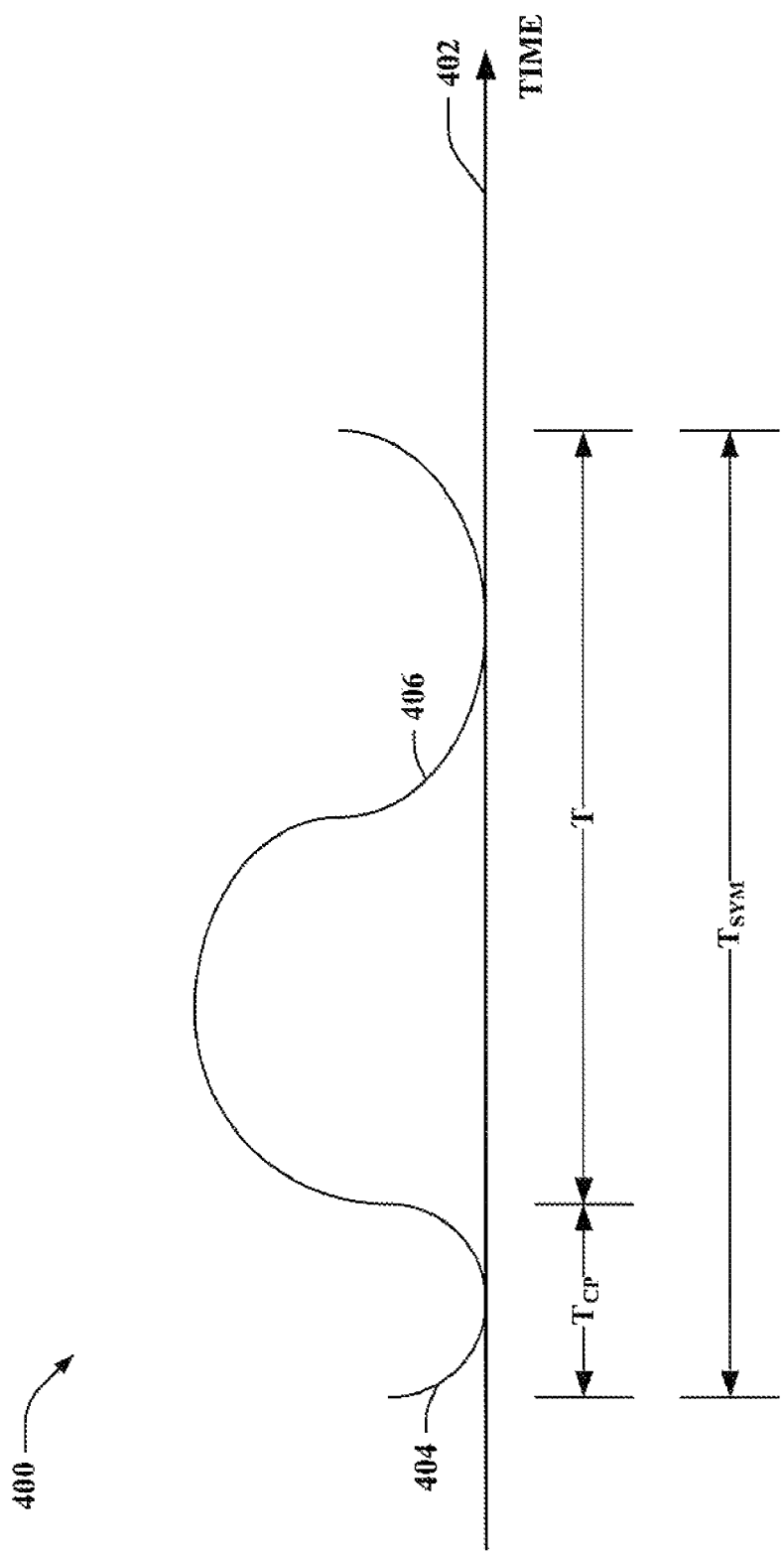
FIG. 4 is an illustration of an example symbol that may be transferred in accordance with various aspects described herein.

Turning to FIG. 4, illustrated is an example symbol 400 that may be transferred in accordance with various aspects described herein. As illustrated, horizontal axis 402 represents time. Symbol 400 may be sinusoidal (e.g., in an OFDM environment). Symbol 400, $T_{SYM}$, includes a cyclic prefix 404 and portion 406 that may carry data (also known as the IFFT window). The length of portion 406 is usually equal to $$\frac{1}{\Delta},$$

where Δ is the tone spacing. A time duration of cyclic prefix 404, $T_{CP}$, may be greater than an expected delay spread. Further, $T_{CP}$ and $T_{SYM}$ may be parameters selected for corresponding networks.

Multipath propagation may cause delay spread. For example a single transmitted signal may reach a receiver by two or more paths. According to this example, copies of the signal may be obtained at differing times associated with the disparate paths. Delay spread may correlate to a size of an area over which signals propagate within a particular network. Pursuant to an illustration, in a wide area network (e.g., which may be associated with a large geographic area), delay spread may be around 2 to 3 μs; thus, the cyclic prefix (e.g., $T_{CP}$) may be around 10 μs. Further, for a local area peer-to-peer network, the delay spread may be smaller (e.g., due to being associated with a smaller geographic area); for instance, the delay spread may be on the order of nanoseconds. Accordingly, a cyclic prefix (e.g., $T_{CP}$) associated with the local area peer-to-peer network may be on the order of 1 μs.

Cyclic prefix 404 is overhead within symbol 400. For example, in a wide area network, 10% of symbol 400 may be overhead (e.g., $T_{CP}$ may be 10 μs and $T_{SYM}$ may be 100 μs). Further, for a local area network, tone spacing (Δ) may be smaller in comparison to tone spacing of the wide area network, and therefore, the FFT window (e.g., $T_{SYM}$) may be increased, which thereby reduces overhead.

Reduction of overhead (e.g., by increasing symbol time and decreasing tone spacing) may be balanced against another design constraint, described below, in the local area peer-to-peer network. Peers may lack an ability to receive and transmit simultaneously in the peer-to-peer network. For example, peer discovery may be effectuated such that peers may transmit signature signals at random time locations. Accordingly, when one of the peers transmits its signature signal, it may lack an ability to receive signature signal(s) transmitted by disparate peer(s). Thus, as symbol time $T_{SYM}$ increases, the probability that a disparate peer will concurrently transmit a symbol increases, making it more likely for one peer to miss the signal sent by another peer; hence, symbol times for the peer-to-peer network (e.g., utilized during peer discovery) may be N times shorter than those utilized for the wide area network, where N may be any real number (e.g., N may be 8), to mitigate probability of overlap of transmission from differing peers.

Figure 5:
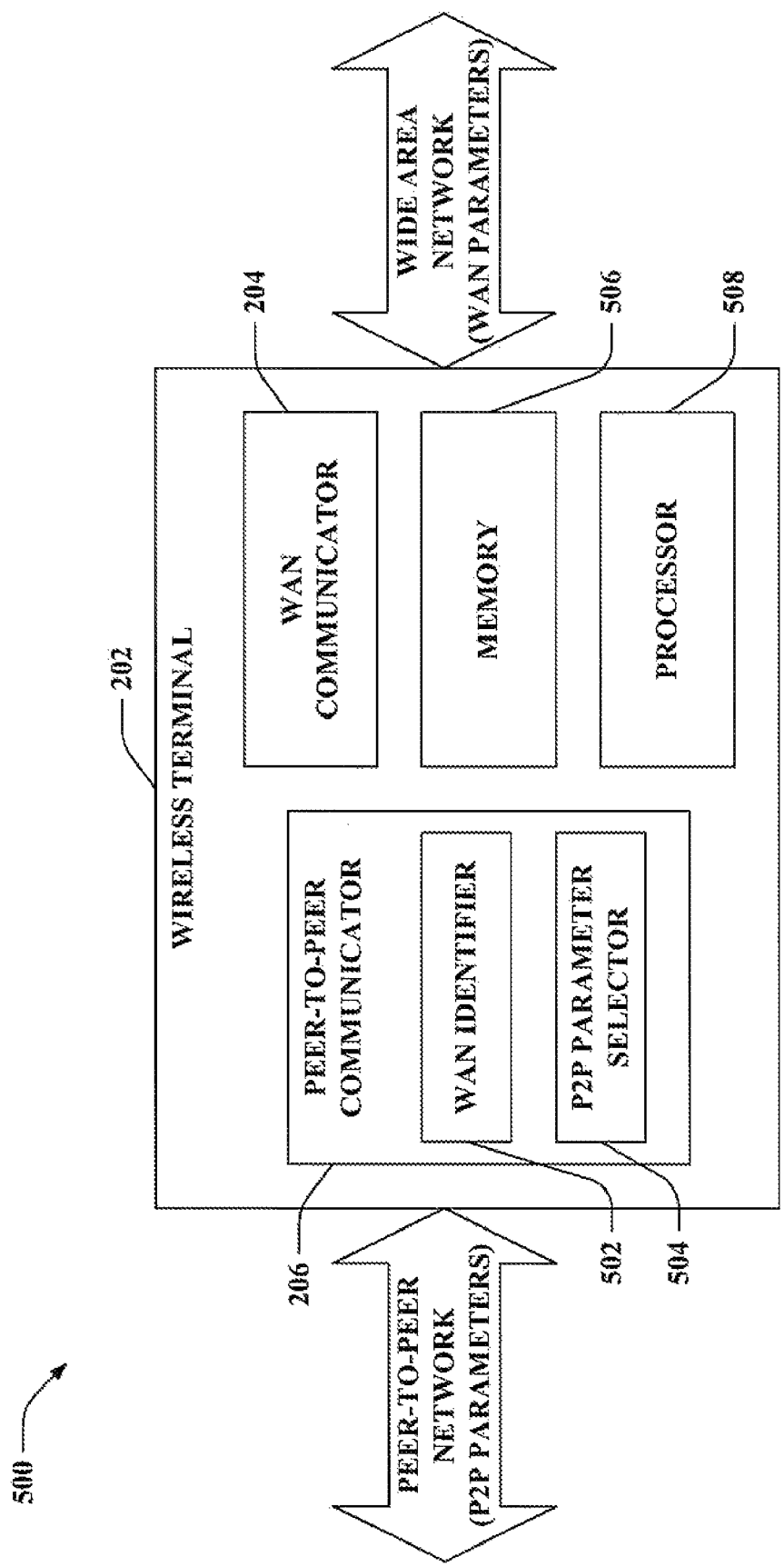
FIG. 5 is an illustration of example system that utilizes a shared spectrum to enable communication via a wide are network and a peer-to-peer network.

Now referring to FIG. 5, illustrated is a system 500 that utilizes a shared spectrum to enable communication via a wide area network and a peer-to-peer network. System 500 includes wireless terminal 202 that may further comprise WAN communicator 204 and peer-to-peer communicator 206, which enable sending and/or receiving data via a wide area network and a peer-to-peer network, respectively. WAN communicator 204 enables wireless terminal 202 to communicate via any type of wide area network (e.g., 3GPP LTE, 3GPP2 EV-DO, CDMA-2000, UMTS W-CDMA, GSM, EDGE, WiMax, Flash-OFDM, . . . ). For example, WAN communicator 204 may utilize an Orthogonal Frequency Division Multiplexing—Time Division Duplex (OFDM-TDD) mode for obtaining and/or transmitting data over the wide area network (e.g., uplink traffic at a first set of times, downlink traffic at a disparate set of times, . . . ). Moreover, peer-to-peer communicator 206 enables wireless terminal 202 to communicate with disparate peer(s) (e.g., disparate wireless terminal(s) (not shown)). According to an example, when leveraging peer-to-peer communicator 206 to operate within the peer-to-peer network, wireless terminal 202 may be unable to concurrently transmit and receive signals from peers. Further to this example, P2P parameters (e.g., short symbol time, . . . ) may be utilized that minimize a probability of disparate peer(s) transmitting at substantially similar times as compared with wireless terminal 202; thus, wireless terminal 202 would likely not miss such data transferred from the disparate peer(s).

Peer-to-peer communicator 206 may further include a WAN identifier 502 and a P2P parameter selector 504. WAN identifier 502 may determine whether a spectrum bandwidth is available to wireless terminal 202 for peer-to-peer communications. Further, WAN identifier 502 may detect the type of the wide area network currently using the spectrum bandwidth, for example, the specific air interface technology used in the WAN. In accordance with this example, WAN identifier 502 may ascertain that the wide area network is one of LTD, 3GPP, 3GPP2, UMTS, WiMax, Flash-OFDM, etc. type wide area network. By way of another example, WAN identifier 502 may further detect system parameters (e.g., WAN parameters) related to the available wide area network. Although WAN identifier 502 is depicted as being included in peer-to-peer communicator 206, it is contemplated that WAN communicator 204 may include WAN identifier 502 and/or WAN identifier 502 may be separate from WAN communicator 204 and peer-to-peer communicator 206. P2P parameter selector 504 may access parameter data (e.g., P2P parameters) to be utilized for the peer-to-peer network as a function of the identified air interface technology used by the wide area network (e.g., type of available wide area network determined by WAN identifier 502) and the associated system parameters. P2P parameters may thereafter be employed to transmit and/or receive data over the peer-to-peer network.

Moreover, wireless terminal 202 may include memory 506 and a processor 508. Memory 506 may retain lookup table(s) that specify P2P parameters and/or WAN parameters that correspond to various types of wide area networks. Further, memory 506 may retain instructions related to determining an identity of a wide area network, detecting parameters associated with the wide area network, identifying and/or deriving parameters to employ with a peer-to-peer network, and so forth. Further, processor 508 may execute the instructions and/or functions described herein.

According to an example, wireless terminal 202 may enter into a wide area network. WAN identifier 502 may determine an identity of the wide area network. Additionally or alternatively, WAN identifier 502 may sense information about the wide area network (e.g., WAN parameters). Further, P2P parameter selector 504 may utilize a lookup table retained in memory 506 to choose P2P parameters (e.g., tone spacing, symbol time, cyclic prefix, ...) to employ for communicating via local area peer-to-peer network. For instance, the lookup table stored in memory 506 may specify values for one or more of the P2P parameters that correlate to the identified type of wide area network. Thus, based upon the identity of the wide area network, P2P parameter selector 504 may employ the lookup table or pre-determined formula to determine P2P parameters to be employed in the same spectrum.

By way of a further illustration, peer-to-peer communicator 206 may calculate parameters to be employed with a local area peer-to-peer network. WAN identifier 502 may determine parameters (e.g., WAN parameters) employed for a wide area network in the same spectrum as a peer-to-peer network. For instance, WAN identifier 502 may find a Beacon, a PN (pseudo random) sequence signal, a pilot signal or other broadcast signals (e.g., transmitted by a base station (not shown)), which may be a signature signal associated with a wide area network. Further, WAN identifier 502 may analyze the broadcast signal to estimate WAN parameters associated with the wide area network. According to another example, WAN identifier 502 may identify the type of wide area network (e.g., the air interface technology used) and determine WAN parameters associated therewith from a lookup table retained in memory 506. It is to be appreciated, however, that the claimed subject matter is not limited to the aforementioned examples. Thereafter, P2P parameter selector 504 may derive parameters for the peer-to-peer network (e.g., P2P parameters) as a function of the parameters of the wide area network (e.g., WAN parameters). Thus, P2P parameter selector 504 may optimize selection of P2P parameters based upon knowledge of optimal WAN parameters for use on a wide area network in the same spectrum.

If the peer-to-peer network coexists in a given spectrum with the wide area network, P2P parameters may be a function of WAN parameters. According to an example, P2P parameter selector 504 may generate P2P parameters based upon such function. Pursuant to a further example, information describing P2P parameters that correlate to WAN parameters may be included in lookup table(s) retained in memory 506. According to an illustration, suppose that both the WAN and the P2P networks use OFDM-based air interface technologies. The P2P parameters may be chosen such that $\Delta_{P2P}=f(\Delta_{WAN})$, where $\Delta_{P2P}$ is the tone spacing for the peer-to-peer network and $\Delta_{WAN}$ is the tone spacing for the wide area network. For example, $\Delta_{P2P}=N\Delta_{WAN}$, where N is a real number. In an embodiment, N>1 (e.g., N=2, 4, 8, 10, 12, 16, ...). In another embodiment, N<1 (e.g., N=½, ¼, ⅛, 1/10, 1/12, 1/16, ...). Moreover, the length of the cyclic prefix is chosen such that $T_{CP\_P2P}=g(T_{CP\_WAN})$, (e.g., $$T_{CP\_P2P} = \frac{1}{K} T_{CP\_WAN},$$

where K=2, 4, 8, 10, 12, 16, etc.). In an embodiment, K=N. Thus, for example, the tone spacing utilized for the peer-to-peer network may be N times larger than the tone spacing employed for the wide area network, and the symbol time for the peer-to-peer network may be N times shorter than the symbol time for the wide area network. Note that the functions f or g may depend on the particular air interface used by the WAN. For example, the functions f or g may be different if the WAN uses the 3GPP LTE air interface technology or if the WAN uses the WiMax air interface technology, even though both technologies may be based on OFDM. Furthermore, according to an illustration, suppose that the P2P network uses OFDM-based air interface technology but the WAN network uses a CDMA-based air interface technology, such as UMTS W-CDMA. The P2P parameters may be chosen such that $\Delta_{P2P}=h(FC_{WAN})$, where $FC_{WAN}$ may represent a system parameter used in the UMTS W-CDMA (e.g., the CDMA chip rate).

Figure 6:
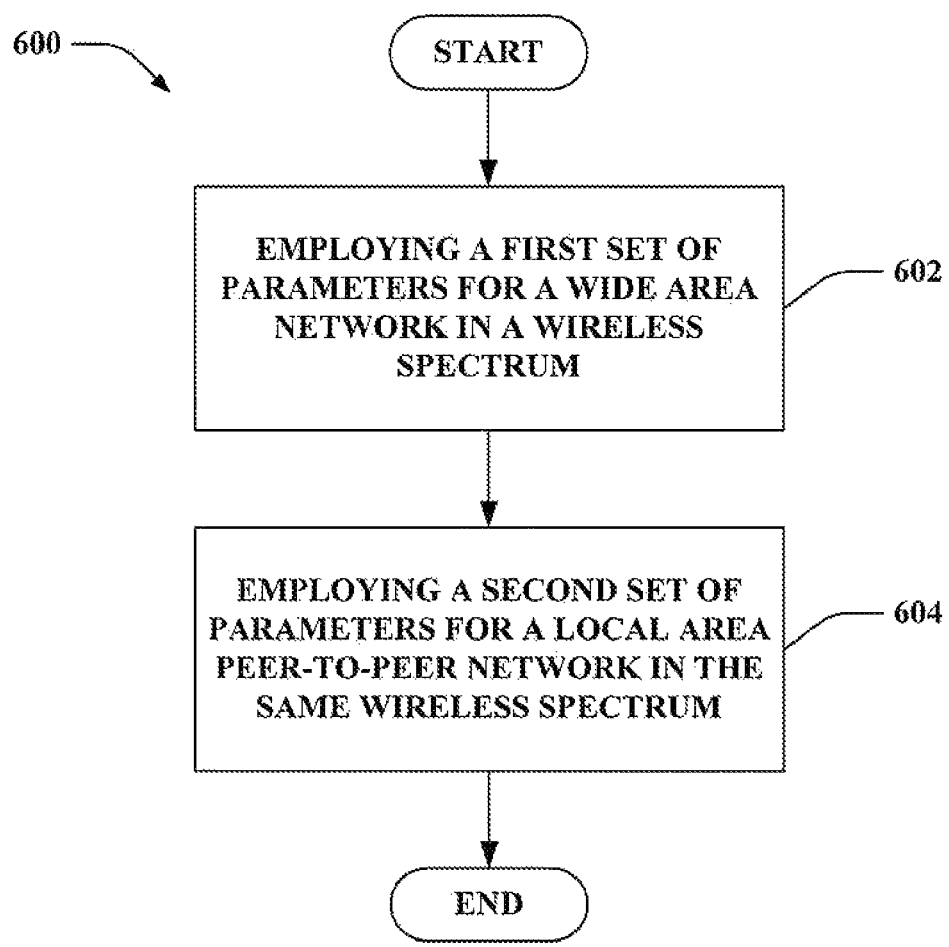
FIG. 6 is an illustration of an example methodology that facilitates sharing bandwidth between a wide area network and a local area peer-to-peer network.
Figure 7:
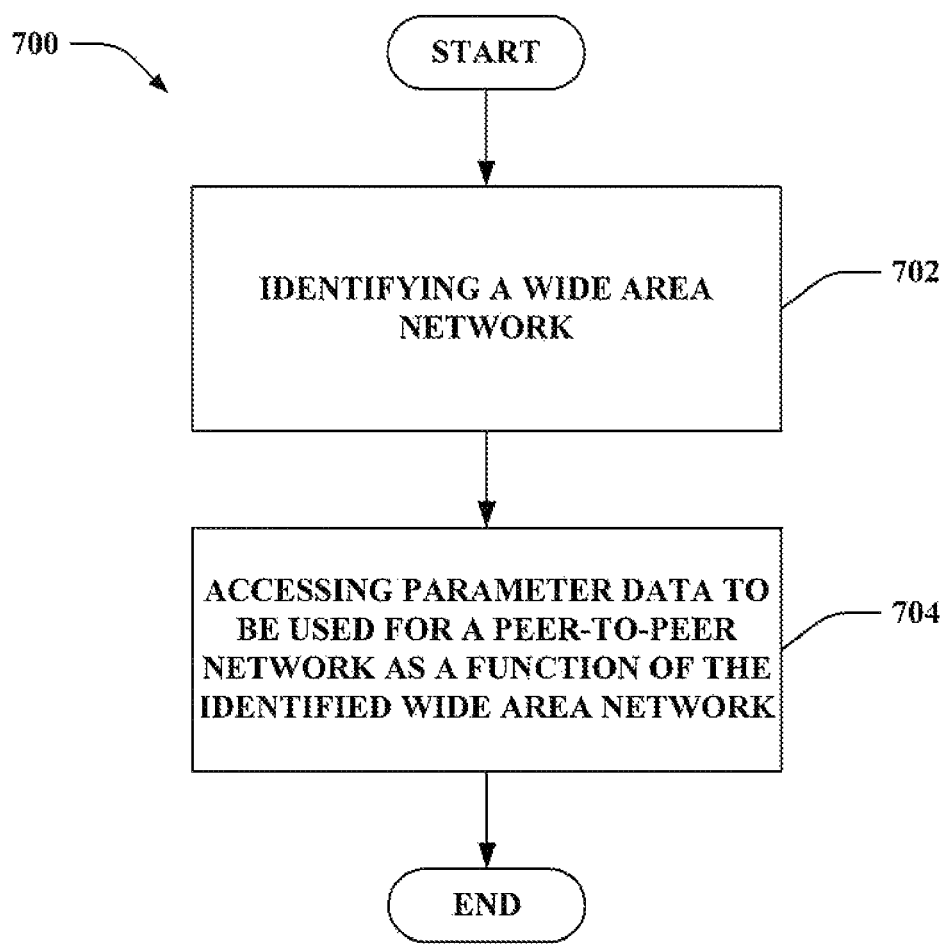
FIG. 7 is an illustration of an example methodology that facilitates identifying parameters to be used for communicating via a local area peer-to-peer network.
Figure 8:
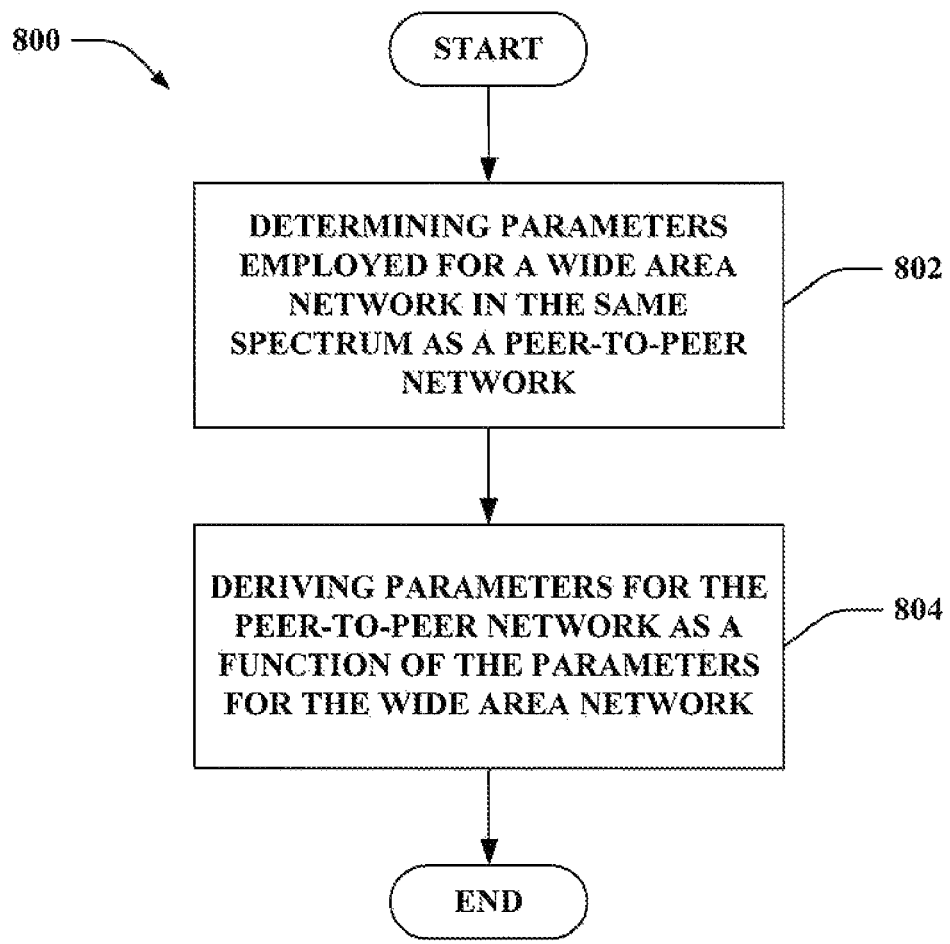
FIG. 8 is an illustration of an example methodology that facilitates calculating parameters for a peer-to-peer network.

Referring to FIGS. 6-8, methodologies relating to sharing bandwidth between a wide are network and a local area peer-to-peer network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Referring to FIG. 6, illustrated is a methodology 600 that facilitates sharing bandwidth between a wide area network and a local area peer-to-peer network. At 602, a first set of parameters may be employed for a wide area network in a wireless spectrum. For example, the parameters may relate to tone spacing, symbol time, cyclic prefix and so forth for an OFDM-based air interface technology, or CDMA chip rate for a CDMA-based air interface technology. Further, disparate types of wide area networks (e.g., LTD, 3GPP, 3GPP2, UMTS, WiMax, Flash-OFDM, . . . ) may each be associated with corresponding sets of parameters. Moreover, the first set of parameters may be utilized to transmit and/or receive data over the wide area network. AT 604, a second set of parameters may be employed for a local area peer-to-peer network in the same wireless spectrum. The second set of parameters may be leveraged to send and/or obtain data over the local area peer-to-peer network. Additionally, parameters in the second set may be a function of parameters in the first set. Further, a common frequency band (e.g., within the licensed spectrum) is employed by the wide area network and the local area peer-to-peer network; for example, the peer-to-peer network may opportunistically employ the shared wireless spectrum when unutilized or underutilized by the wide area network. The second set of parameters utilized with the local area peer-to-peer network may include a shorter symbol time, a shorter cyclic prefix, and/or a larger tone spacing as compared to the first set of parameters employed with the wide area network.

Now turning to FIG. 7, illustrated is a methodology 700 that facilitates identifying parameters to be used for communicating via a local area peer-to-peer network. At 702, a wide area network may be identified. For instance, information may be sensed about the wide area network. By way of further example, a Beacon signal associated with the wide area network may be received, and the Beacon signal may indicate an availability, the type of the wide area network air interface technology, and/or the system parameters used. At 704, parameter data to be used for a peer-to-peer network may be accessed as a function of the identified wide area network. In accordance with an example, parameter data may be obtained from a lookup table retained in memory. Pursuant to another example, parameter data may be calculated based upon disparate parameter data corresponding to the wide area network. Thereafter, the parameter data may be employed to transmit and /or receive data over the peer-to-peer network. By way of further example, the peer-to-peer network parameters may reduce the probability that a half-duplex first peer may miss the signal transmitted by a second peer while the first peer is itself transmitting.

referring to FIG. 8, illustrated is a methodology 800 that facilitates calculating parameters for a peer-to-peer network. At 802, parameters employed for a wide area network in the same spectrum as a peer-to-peer network may be determined. For example, a signature signal associated with the wide area network may be received, and parameters associated therewith may be identified. According to another illustration, parameters for the wide area network may be determined from a lookup table based upon the type of wide area network. At 804, parameters for the peer-to-peer network may be derived as a function of the parameters for the wide area network. According to an example, tone spacing for the peer-to-peer network may be N times larger than tone spacing of the wide area network, while symbol time for the peer-to-peer network may be N times shorter than symbol time for the wide area network; further to this example, N may be any real number (e.g., N may be 8).

It will be appreciated that, in accordance with one or more aspects described herein, inferences can be made regarding sharing wireless spectrum for communicating via a wide area network and a local area peer-to-peer network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining parameters to utilize in connection with communicating via the peer-to-peer network. In accordance with another example, an inference may be made related to identifying a time during which the shared spectrum may be utilized for transferring data over the peer-to-peer network. It will be appreciated that the foregoing examples are illustrative in nature and are not intended to limit the number of inferences that can be made or the manner in which such inferences are made in conjunction with the various embodiments and/or methods described herein.

Figure 9:
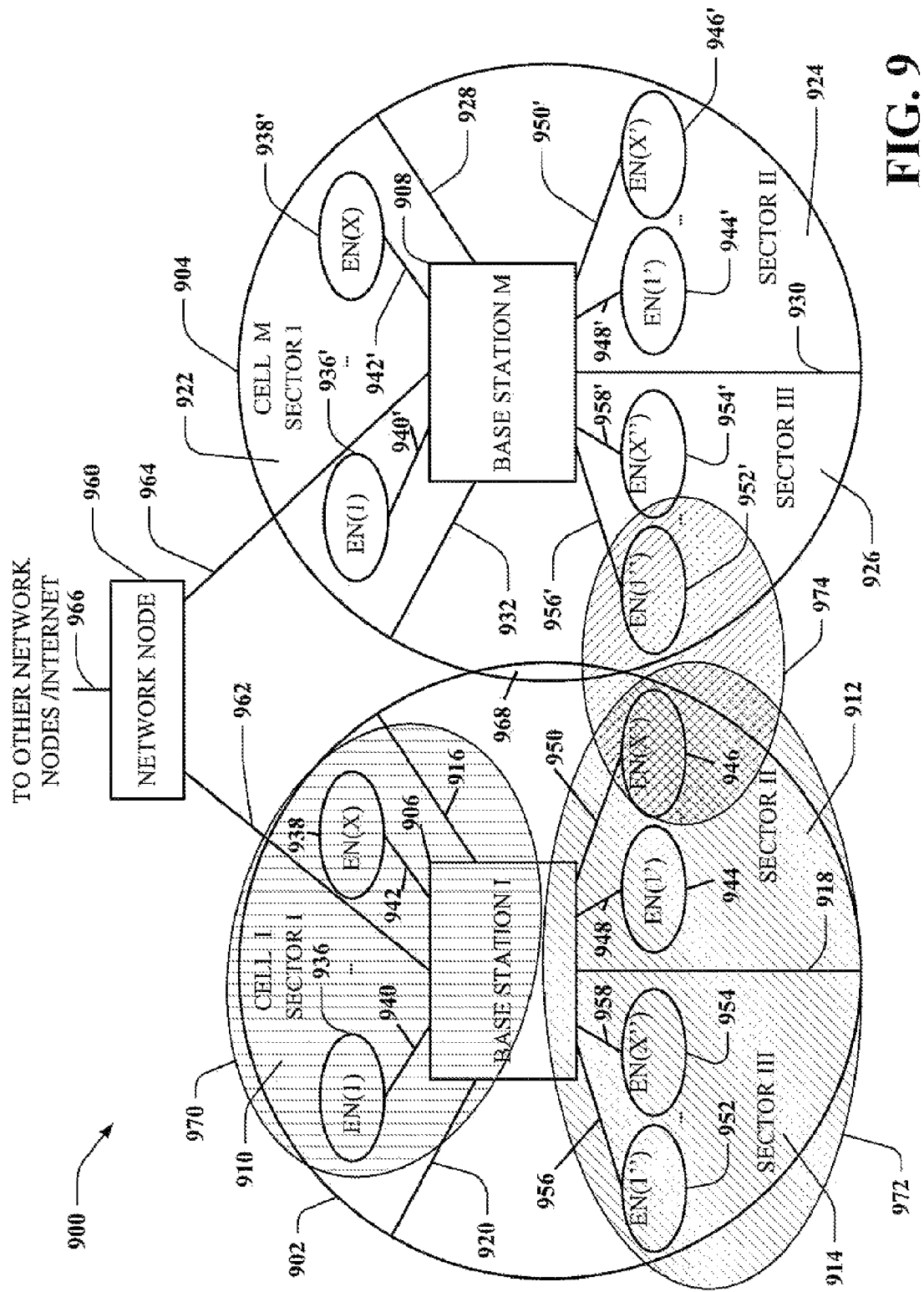
FIG. 9 is an illustration of an example communication system implemented in accordance with various aspects including multiple cells.

FIG. 9 depicts an example communication system 900 implemented in accordance with various aspects including multiple cells: cell I 902, cell M 904. Note that neighboring cells 902, 904 overlap slightly, as indicated by cell boundary region 968, thereby creating potential for signal interference between signals transmitted by base stations in neighboring cells. Each cell 902, 904 of system 900 includes three sectors. Cells which have not be subdivided into multiple sectors (N=1), cells with two sectors (N=2) and cells with more than 3 sectors (N>3) are also possible in accordance with various aspects. Cell 902 includes a first sector, sector I 910, a second sector, sector II 912, and a third sector, sector III 914. Each sector 910, 912, 914 has two sector boundary regions; each boundary region is shared between two adjacent sectors.

Sector boundary regions provide potential for signal interference between signals transmitted by base stations in neighboring sectors. Line 916 represents a sector boundary region between sector I 910 and sector II 912; line 918 represents a sector boundary region between sector II 912 and sector III 914; line 920 represents a sector boundary region between sector III 914 and sector I 910. Similarly, cell M 904 includes a first sector, sector I 922, a second sector, sector II 924, and a third sector, sector III 926. Line 928 represents a sector boundary region between sector I 922 and sector II 924; line 930 represents a sector boundary region between sector II 924 and sector II 926; line 932 represents a boundary region between sector III 926 and sector I 922. Cell I 902 includes a base station (BS), base station I 906, and a plurality of end nodes (ENs) (e.g., wireless terminals) in each sector 910, 912, 914. Sector I 910 includes EN(1) 936 and EN(X) 938 coupled to BS 906 via wireless links 940, 942, respectively; sector II 912 includes EN(1') 944 and EN(X') 946 coupled to BS 906 via wireless links 948, 950, respectively; sector III 914 includes EN(1") 952 and EN(X") 954 coupled to BS 906 via wireless links 956, 958, respectively. Similarly, cell M 904 includes base station M 908, and a plurality of end nodes (ENs) in each sector 922, 924, 926. Sector I 922 includes EN(1) 936' and EN(X) 938' coupled to BS M 908 via wireless links 940', 942', respectively; sector II 924 includes EN(1') 944' and EN(X') 946' coupled to BS M 908 via wireless links 948', 950', respectively; sector 3 926 includes EN(1") 952' and EN(X") 954' coupled to BS 908 via wireless links 956', 958', respectively.

System 900 also includes a network node 960 which is coupled to BS I 906 and BS M 908 via network links 962, 964, respectively. Network node 960 is also coupled to other network nodes, e.g., other base stations, AAA server nodes, intermediate nodes, routers, etc. and the Internet via network link 966. Network links 962, 964, 966 may be, e.g., fiber optic cables. Each end node, e.g., EN(1) 936 may be a wireless terminal including a transmitter as well as a receiver. The wireless terminals e.g., EN(1) 936 may move through system 900 and may communicate via wireless links with the base station in the cell in which the EN is currently located. The wireless terminals, (WTs), e.g., EN(1) 936, may communicate with peer nodes, e.g., other WTs in system 900 or outside system 900 via a base station, e.g., BS 906, and/or network node 960. WTs, e.g., EN(1) 936 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Local area peer-to-peer communication may also be supported by communication system 900. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 970, 972, and 974. Although three peer-to-peer networks 970-974 are depicted, it is to be appreciated that any number, size, shape, etc. of peer-to-peer networks may be supported. For instance, each peer-to-peer network 970-974 may support transfer of signals directly between wireless terminals. Further, each peer-to-peer network 970-974 may include wireless terminals within a similar geographic area (e.g., within range of one another). For example, EN(1) 936 may communicate with EN(X) 938 by way of the local area peer-to-peer network 970. However, it is to be appreciated that wireless terminals need not be associated with the same sector and/or cell to be included in a common peer-to-peer network. Further, peer-to-peer networks may overlap (e.g., EN(X') 946 may leverage peer-to-peer networks 972 and 974). Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 10:
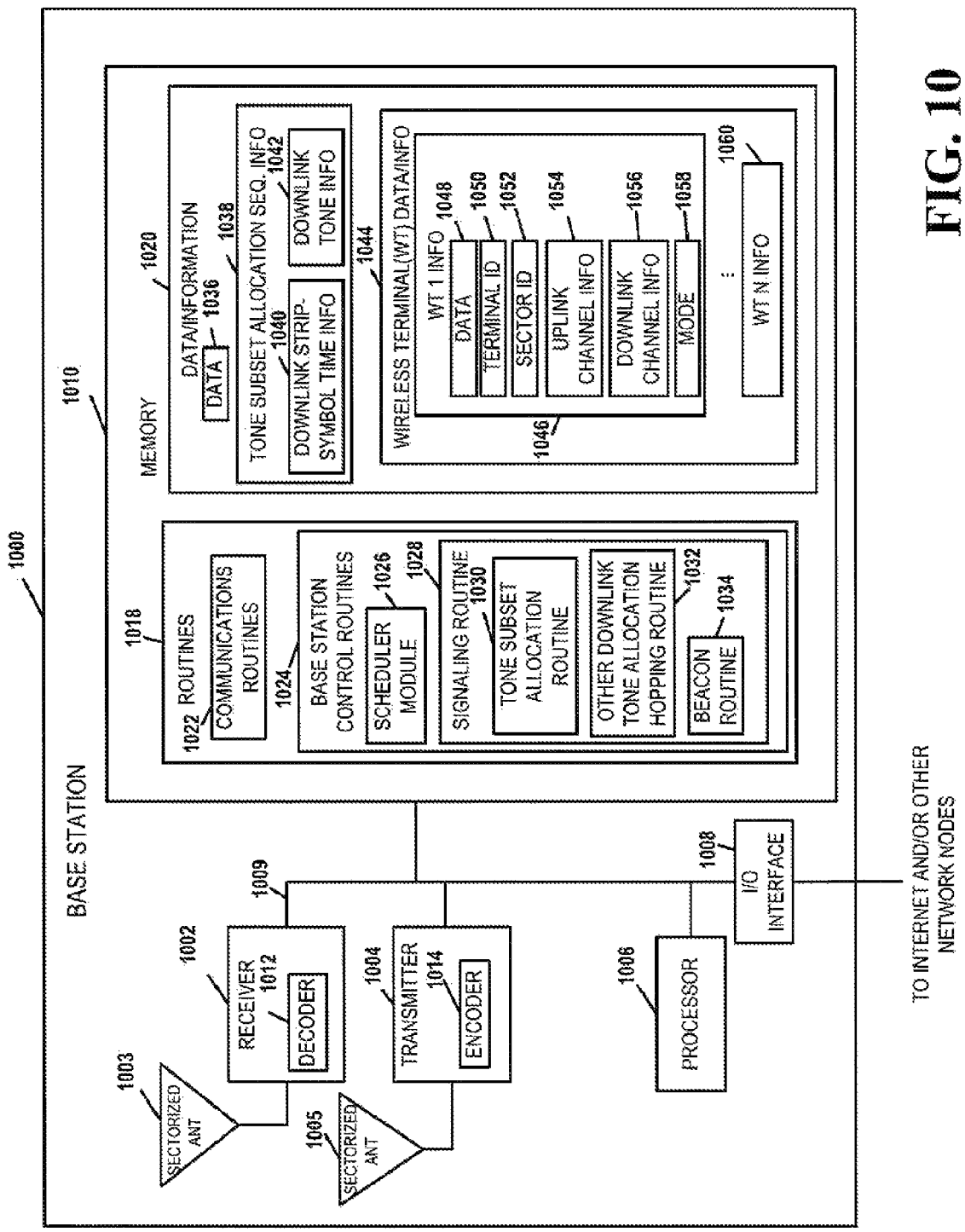
FIG. 10 is an illustration of an example base station in accordance with various aspects.

FIG. 10 illustrates an example base station 1000 in accordance with various aspects. Base station 1000 implements tone subset allocation sequences, with different tone subset allocation sequences generated for respective different sector types of the cell. Base station 1000 may be used as any one of base stations 906, 908 of the system 900 of FIG. 9. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 may interchange data and information.

Sectorized antenna 1003 coupled to receiver 1002 is used for receiving data and other signals, e.g., channel reports, from wireless terminals transmissions from each sector within the base station's cell. Sectorized antenna 1005 coupled to transmitter 1004 is used for transmitting data and other signals, e.g., control signals, pilot signal, beacon signals, etc. to wireless terminals 1100 (see FIG. 11) within each sector of the base station's cell. In various aspects, base station 1000 may employ multiple receivers 1002 and multiple transmitters 1004, e.g., an individual receiver 1002 for each sector and an individual transmitter 1004 for each sector. Processor 1006, may be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 104 of transmitter 1004 for encoding prior to transmission to WTs, and received data from WTs that has been processed through decode 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 may include data that WT1 1100 has received from a peer node, data that WT 1 1100 desires to be transmitted to a peer node, and downlink channel quality report feedback information. Terminal ID 1050 is a base station 1000 assigned ID that identifies WT 1 1100. Sector ID 1052 includes information identifying the sector in which WT1 1100 is operating. Sector ID 1052 can be used, for example, to determine the sector type. Uplink channel information 1054 includes information identifying channel segments that have been allocated by scheduler 1026 for WT1 1100 to use, e.g., uplink traffic channel segments for data, dedicated uplink control channels for requests, power control, timing control, etc. Each uplink channel assigned to WT1 1100 includes one or more logical tones, each logical tone following an uplink hopping sequence. Downlink channel information 1056 includes information identifying channel segments that have been allocated by scheduler 1026 to carry data and/or information to WT1 1100, e.g., downlink traffic channel segments for user data. Each downlink channel assigned to WT 1 1100 includes one or more logical tones, each following a downlink hopping sequence. Mode information 1058 includes information identifying the state of operation of WT1 1100, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible for controlling the generation of transmitted data 1036 and control information. Tone subset allocation routine 1030 constructs the tone subset to be used in a strip-symbol period using the method of the aspect and using data/information 1020 including downlink strip-symbol time info 1040 and sector ID 1052. The downlink tone subset allocation sequences will be different for each sector type in a cell and different for adjacent cells. The WTs 1100 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 11:
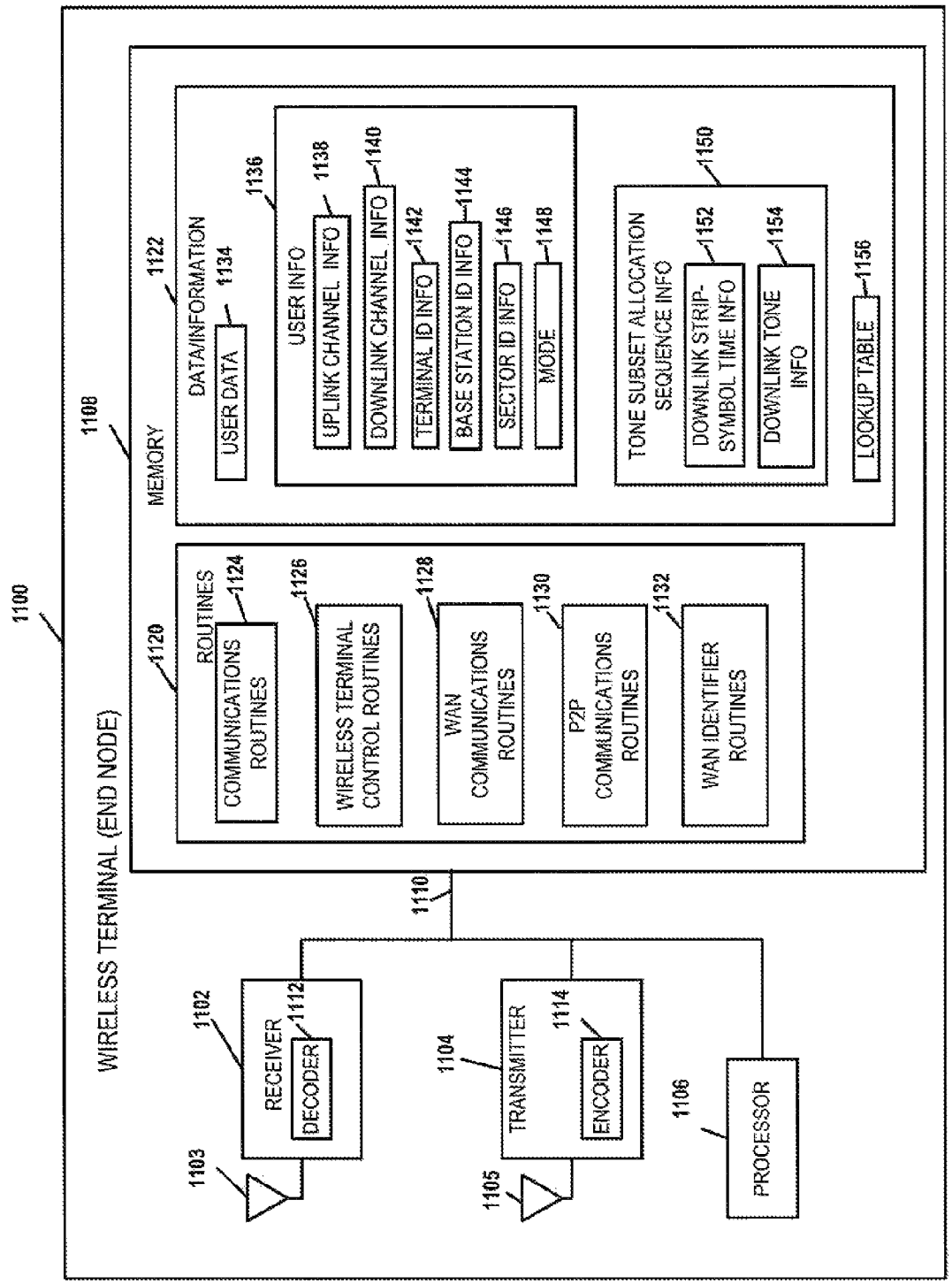
FIG. 11 is an illustration of an example wireless terminal (e.g., mobile device, end node, . . . ) implemented in accordance with various aspects described herein.

FIG. 11 illustrates an example wireless terminal (e.g., end node, mobile device, . . . ) 1100 which can be used as any one of the wireless terminals (e.g., end nodes, mobile devices, . . . ), e.g., EN(1) 936, of the system 900 shown in FIG. 9. Wireless terminal 1100 implements the tone subset allocation sequences. The wireless terminal 1100 includes a receiver 1102 including a decoder 1112, a transmitter 1104 including an encoder 1114, a processor 1106, and memory 1108 which are coupled together by a bus 1110 over which the various elements 1102, 1104, 1106, 1108 can interchange data and information. An antenna 1103 used for receiving signals from a base station 1000 is coupled to receiver 1102. An antenna 1105 used for transmitting signals, e.g., to base station 1000 is coupled to transmitter 1104.

The processor 1106, e.g., a CPU controls the operation of the wireless terminal 1100 and implements methods by executing routines 1120 and using data/information 1122 in memory 1108.

Data/information 1122 includes user data 1134, user information 1136, tone subset allocation sequence information 1150, and lookup table 1156. User data 1134 may include data, intended for a peer node, which will be routed to encoder 1114 for encoding prior to transmission by transmitter 1104 to base station 1000, and data received from the base station 1000 which has been processed by the decoder 1112 in receiver 1102. User information 1136 includes uplink channel information 1138, downlink channel information 1140, terminal ID information 1142, base station ID information 1144, sector ID information 1146, and mode information 1148. Uplink channel information 1138 includes information identifying uplink channels segments that have been assigned by base station 1000 for wireless terminal 1100 to use when transmitting to the base station 1000. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1140 includes information identifying downlink channel segments that have been assigned by base station 1000 to WT 1100 for use when BS 1000 is transmitting data/information to WT 1100. Downlink channels may include downlink traffic channels and assignment channels, each downlink channel including one or more logical tone, each logical tone following a downlink hopping sequence, which is synchronized between each sector of the cell.

User info 1136 also includes terminal ID information 1142, which is a base station 1000 assigned identification, base station ID information 1144 which identifies the specific base station 1000 that WT has established communications with, and sector ID info 1146 which identifies the specific sector of the cell where WT 1100 is presently located. Base station ID 1144 provides a cell slope value and sector ID info 1146 provides a sector index type; the cell slope value and sector index type may be used to derive tone hopping sequences. Mode information 1148 also included in user info 1136 identifies whether the WT 1100 is in sleep mode, hold mode, or on mode.

Tone subset allocation sequence information 1150 includes downlink strip-symbol time information 1152 and downlink tone information 1154. Downlink strip-symbol time information 1152 include the frame synchronization structure information, such as the superslot, beaconslot, and ultraslot structure information, and information specifying whether a given symbol period is a strip-symbol period, and if so, the index of the strip-symbol period and whether the strip-symbol is a resetting point to truncate the tone subset allocation sequence used by the base station. Downlink tone info 1154 includes information including a carrier frequency assigned to the base station 1000, the number and frequency of tones, and the set of tone subsets to be allocated to the strip-symbol periods, and other cell and sector specific values such as slope, slope index and sector type.

Routines 1120 include communications routines 1124, wireless terminal control routines 1126, WAN communications routines 1128, P2P communications routines 1130, and WAN identifier routines 1132. Communications routines 1124 control the various communications protocols used by WT 1100. Wireless terminal control routines 1126 control basic wireless terminal 1100 functionality including the control of the receiver 1120 and transmitter 1104. WAN communications routines 1128 control communications with base station 1000 (and/or any disparate base station) over a wide area network (e.g., cellular network). For example, WAN communications routines 1128 may enable estimating a first set of parameters for communicating via the wide area network. P2P communications routines 1130 control communications with peer(s) (e.g., disparate wireless terminals) via a local area peer-to-peer network. For example, the P2P communications routines 1130 may identify parameters (e.g., tone spacing, cyclic prefix, symbol time, . . . ) to be employed for peer-to-peer communication. P2P communication routines 1130 may enable deriving, accessing from lookup table 1156, etc. this second set of parameters. WAN identifier routines 1132 control identifying a type of WAN air interface technology.

Figure 12:
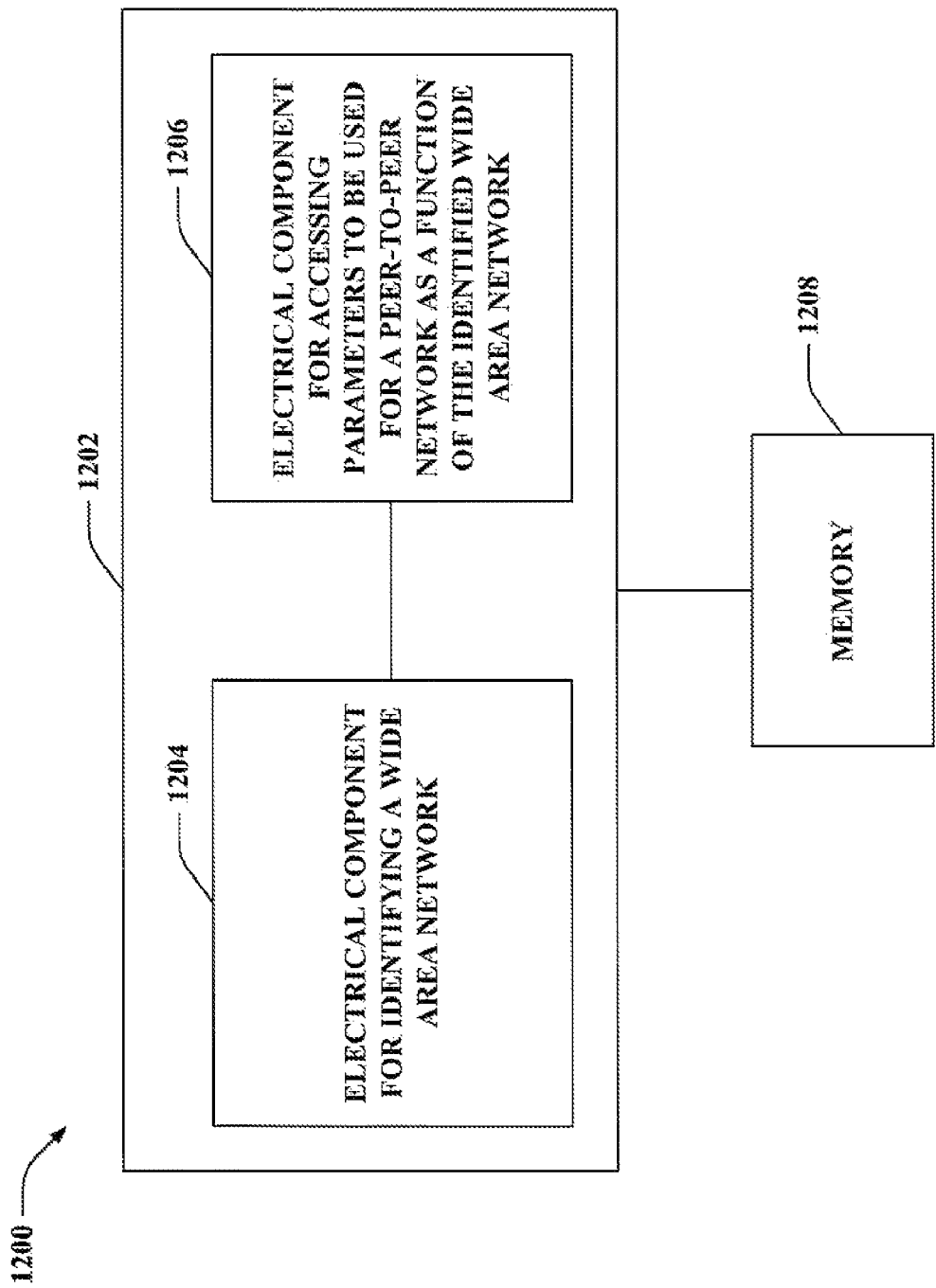
FIG. 12 is an illustration of an example system that enables communication over a wide area network and a local area peer-to-peer network.

With reference to FIG. 12, illustrated is a system 1200 that enables communication over a wide area network and a local area peer-to-peer network. For example, system 1200 may reside at least partially within a wireless terminal. It is to be appreciated that system 1200 is represented as including functional blocks, which may be functional blocks that represent functions implemented by a processor, software, or combination thereof (e.g., firmware). System 1200 includes a logical grouping 1202 of electrical components that can act in conjunction. For instance, logical grouping 1202 may include an electrical component for identifying a wide area network 1204. For example, a received Beacon signal may be analyzed to determine that the wide area network is available, the type of wide area network, parameters associated with the wide area network, and so forth. Further, logical grouping 1202 may comprise an electrical component for accessing parameters to be used for a peer-to-peer network as a function of the identified wide area network 1206. The peer-to-peer network may utilize bandwidth that is shared with the wide area network. According to an example, the parameters to be employed for the peer-to-peer network may be derived (e.g., based upon the type of wide area network, parameters corresponding to the wide area network, . . . ). Pursuant to a further example, the peer-to-peer network parameters may be identified from a lookup table. Additionally, system 1200 may include a memory 1208 that retains instructions for executing functions associated with electrical components 1204 and 1206. While shown as being external to memory 1208, it is to be understood that one or more of electrical components 1204 and 1206 may exist within memory 1208.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communicating via a shared spectrum, comprising:
 identifying a wide area network from a received signal;
 employing a first set of parameters for said wide area network in a wireless spectrum;
 determining, based upon the identity of the wide area network, local area network parameters to be employed in wireless spectrum used by said identified wide area network, said local area network parameters being a second set of parameters, said second set of parameters including at least one of tone spacing or cyclic prefix duration, at least one parameter in said second set of parameters differing from a parameter in the first set from which said at least one parameter is generated; and
 employing the second set of parameters for peer to peer communications in a local area peer-to-peer network in the same wireless spectrum used by said wide area network.

2. The method of claim 1, wherein said method is implemented by a mobile wireless terminal.

3. The method of claim 1, wherein an OFDM-based air interface technology is used in the local area peer-to-peer network and a CDMA-based air interface technology is used in the wide area network.

4. The method of claim 1, wherein OFDM-based air interface technologies are used in both the local area peer-to-peer network and the wide area network.

5. The method of claim 1, wherein determining, based upon the identity of the wide area network, local area network parameters includes:
 determining wide area network parameters associated with the identified wide area network from a lookup table; and
 deriving parameters for the peer-to-peer network from the wide area network parameters determined from the lookup table.

6. The method of claim 5,
 wherein the second set of parameters includes a parameter indicating a shorter symbol time, a shorter cyclic prefix and/or a larger tone spacing than is indicated by a parameter in the first set of parameters; and wherein the first set of parameters includes a tone spacing N times larger than a tone spacing included in the second set of parameters, where N is a real number no less than 2.

7. The method of claim 5, wherein the second set of parameters includes a cyclic prefix K times shorter than a disparate cyclic prefix included in the first set of parameters, where K is a real number no less than 2.

8. The method of claim 1, wherein the second set of parameters includes a parameter indicating a shorter cyclic prefix and/or a smaller tone spacing than is indicated by a parameter in the first set of parameters.

9. The method of claim 1, further comprising opportunistically communicating via the local area peer-to-peer network when the wireless spectrum is unutilized or underutilized by the wide area network.

10. The method of claim 1, further comprising:
estimating a value of at least one parameter in the first set of parameters used in an air interface of the wide area network; and
obtaining the second set of parameters for the local area peer-to-peer network as a function of the estimated value of said at least one parameter.

11. The method of claim 10, further comprising identifying the air interface technology used in the wide area network.

12. The method of claim 11, wherein obtaining the second set of parameters further comprises obtaining the second set of parameters from a lookup table based upon the estimated value of the at least one parameter used in the air interface of the wide area network or the identified air interface technology used in the wide area network.

13. The method of claim 11, wherein obtaining the second set of parameters further comprises calculating at least part of the second set of parameters based upon the estimated value of the at least one parameter used in the air interface of the wide area network or the identified air interface technology used in the wide area network.

14. The method of claim 10, wherein estimating the value of at least one parameter further comprises receiving a Beacon signal associated with the wide area network.

15. A wireless communications apparatus, comprising:
a memory that retains instructions for controlling the communications apparatus to:
identify a wide area network (WAN) from a received signal;
employ a first set of parameters for said wide area network in a wireless spectrum;
determine, based upon the identity of the wide area network, local area network parameters to be employed in the wireless spectrum used by said wide area network, said local area network parameters being a second set of parameters, said second set of parameters including at least one of tone spacing or cyclic prefix duration, at least one parameter in said second set of parameters differing from a parameter in the first set from which said at least one parameter is generated; and
employ the second set of parameters for peer to peer communications in a local area peer-to-peer network in the same wireless spectrum used by said wide area network; and
a processor, coupled to the memory, configured to execute the instructions retained in the memory.

16. The wireless communications apparatus of claim 15, wherein the memory further retains instructions for controlling said apparatus to receive a signature signal associated with the wide area network and estimating a value of at least one WAN parameter used in an air interface of the wide area network based upon the signature signal.

17. The wireless communications apparatus of claim 16, wherein the memory further retains instructions for controlling said apparatus to identify the air interface technology used in the wide area network.

18. The wireless communications apparatus of claim 17, wherein the memory further retains a lookup table that includes a plurality of sets of parameter data for the peer-to-peer network that correspond to a plurality of air interface technologies of wide area networks.

19. The wireless communications apparatus of claim 18, wherein the memory further retains instructions for controlling said apparatus to retrieve the parameter data from the lookup table based upon the estimated value of the at least one parameter used in the air interface of the wide area network or the identified air interface technology used in the wide area network.

20. The wireless communications apparatus of claim 17, wherein the memory further retains instructions for controlling said apparatus to determine said parameters as a function of the estimated value of the at least one parameter used in the air interface of the wide area network or the identified air interface technology used in the wide area network.

21. The wireless communications apparatus of claim 15, wherein the memory further retains instructions for controlling said apparatus to communicate via the wide area network and the peer-to-peer network utilizing a common spectrum.

22. The wireless communications apparatus of claim 15, wherein the memory further retain instructions for controlling said apparatus to:
determine wide area network parameters associated with the wide area network from a lookup table; and
derive parameters for the peer-to-peer network from the wide area network parameters determined from the lookup table.

23. The wireless communications apparatus of claim 15, wherein OFDM-based air interface technologies are used in both the peer-to-peer network and the wide area network.

24. The wireless communications apparatus of claim 23, wherein the second set of parameters to be used for the peer-to-peer network includes a parameter indicating a shorter symbol time, a shorter cyclic prefix and/or a larger tone spacing than is indicated by a parameter in the first set of parameters used for communications in the wide area network.

25. The wireless communications apparatus of claim 23, wherein the second set of parameters to be used for the peer-to-peer network includes a parameter indicating a shorter cyclic prefix and/or a smaller tone spacing than is indicated by a parameter in the first set of parameters used for communications in the wide area network.

26. The wireless communications apparatus of claim 15 wherein said wireless communications apparatus is a mobile wireless terminal that performs both Wide Area Network Communications and Peer-to-Peer communications.

27. A wireless communications apparatus that enables communication over a wide area network and a local area peer-to-peer network, comprising:
means for identifying a wide area network from a received signal;
means for employing a first set of parameters for said wide area network in a wireless spectrum;
means for determining, based upon the identified wide area network, local area network parameters to be used in the wireless spectrum used by said identified wide area network, said local area network parameters being a second set of parameters, said second set of parameters including at least one of tone spacing or cyclic prefix duration, at least one parameter in said second set of parameters differing from a parameter in the first set from which said at least one parameter is generated, the second set of parameters being employed for peer-to-peer communications in a local area peer-to-peer network which uses the same wireless spectrum used by said wide area network.

28. The wireless communications apparatus of claim 27, further comprising means for utilizing a shared bandwidth to communicate over the wide area network and the local area peer-to-peer network.

29. The wireless communications apparatus of claim 27, further comprising means for determining an air interface technology associated with the wide area network.

30. The wireless communications apparatus of claim 27, further comprising means for estimating differing parameters to be employed for the wide area network.

31. The wireless communications apparatus of claim 27, wherein said means for determining the local area network parameters to be used for the local area peer-to-peer network includes means for deriving a peer to peer network parameter from a wide area network parameter.

32. The wireless communications apparatus of claim 27, further comprising means for opportunistically communicating via the local area peer-to-peer network when a common spectrum is unutilized or underutilized by the wide area network.

33. The wireless communications apparatus of claim 27, wherein an OFDM-based air interface technology is used in the local area peer-to-peer network and a CDMA-based air interface technology is used in the wide area network.

34. The wireless communications apparatus of claim 27, wherein OFDM-based air interface technologies are used in both the local area peer-to-peer network and the wide area network.

35. The wireless communications apparatus of claim 34, wherein the second set of parameters to be used for the peer-to-peer network include a parameter indicating a shorter symbol time, a shorter cyclic prefix or a larger tone spacing than is indicated by a parameter in the first set of parameters used for communicating in the wide area network.

36. The wireless communications apparatus of claim 34, wherein the second set of parameters to be used for the local area peer-to-peer network include a parameter indicating a shorter cyclic prefix or a smaller tone spacing than is indicated by a parameter in the first set of parameters used for communicating in the wide area network.

37. A non-transitory machine-readable medium having stored thereon machine-executable instructions for:
 identifying a wide area network from a received signal;
 utilizing a first set of parameters for said wide area network;
 determining, based upon the identity of the wide area network, local area network parameters to be employed in wireless spectrum used by said identified wide area network, said local area network parameters being a second set of parameters, said second set of parameters including at least one of tone spacing or cyclic prefix duration, at least one parameter in said second set of parameters differing from a parameter in the first set from which said at least one parameter is generated; and
 utilizing the second set of parameters for peer to peer communications in a local area peer-to-peer network that leverages a common wireless spectrum as used by the wide area network.

38. The non-transitory machine-readable medium of claim 37, wherein an OFDM-based air interface technology is used in the local area peer-to-peer network and a CDMA-based air interface technology is used in the wide area network.

39. The non-transitory machine-readable medium of claim 37, wherein OFDM-based air interface technologies are used in both the local area peer-to-peer network and the wide area network.

40. The non-transitory machine-readable medium of claim 39, wherein the second set of parameters includes a longer symbol time, a shorter cyclic prefix and/or a smaller tone spacing than the first set of parameters.

41. The non-transitory machine-readable medium of claim 37, wherein the machine-executable instructions for determining, based upon the identity of the wide area network, local area network parameters include machine-executable instructions for:
 determining wide area network parameters associated with the wide area network from a lookup table; and
 deriving parameters for the peer-to-peer network from the wide area network parameters determined from the lookup table.

42. The non-transitory machine-readable medium of claim 41, wherein the second set of parameters includes a parameter indicating a shorter symbol time, a shorter cyclic prefix and/or a larger tone spacing than is indicated by a parameter in the first set of parameters; and
 wherein the second set of parameters includes a tone spacing N times smaller than a tone spacing included in the first set of parameters, where N is a real number no less than 2.

43. The non-transitory machine-readable medium of claim 41, wherein the second set of parameters includes a cyclic prefix K times shorter than a disparate cyclic prefix included in the first set of parameters, where K is a real number no less than 2.

44. The non-transitory machine-readable medium of claim 37, further comprising machine-executable instructions for opportunistically transmitting over the local area peer-to-peer network utilizing a spectrum shared with the wide area network.

45. The non-transitory machine-readable medium of claim 37, further comprising machine-executable instructions for estimating a value of at least one parameter in the first set of parameters used in an air interface of the wide area network and for obtaining the second set of parameters for the local area peer-to-peer network as a function of the estimated parameter.

46. The non-transitory machine-readable medium of claim 45, further comprising machine-executable instructions for identifying the air interface technology used in the wide area network.

47. The non-transitory machine-readable medium of claim 46, further comprising machine-executable instructions for obtaining the second set of parameters from a lookup table based upon the estimated value of the at least one parameter used in the air interface of the wide area network or the identified air interface technology used in the wide area network.

48. The non-transitory machine-readable medium of claim 46, further comprising machine-executable instructions for calculating at least part of the second set of parameters based upon the estimated value of the at least one parameter used in the air interface of the wide area network or the identified air interface technology used in the wide area network.

49. The non-transitory machine-readable medium of claim 45, further comprising machine-executable instructions for receiving a Beacon signal associated with the wide area network upon which to estimate the value of at least one parameter.

50. In a wireless communication system, an apparatus comprising:
   a processor configured to:
      identify a wide area network from a received signal;
      employing a first set of parameters for said wide area network in a wireless spectrum;
      determine, based upon the identity of the identified wide area network, local area network parameters to be employed in said wireless spectrum used by said identified wide area network, said local area network parameters being a second set of parameters, said second set of parameters including at least one of tone spacing or cyclic prefix duration, at least one parameter in said second set of parameters differing from a parameter in the first set from which said at least one parameter is generated; and
   employ the second set of parameters for peer to peer communications in a local area peer-to-peer network in the same wireless spectrum used by said wide area network.

\* \* \* \* \*